(12) United States Patent
Huber

(10) Patent No.: US 8,973,769 B2
(45) Date of Patent: Mar. 10, 2015

(54) CARGO HOLDING DEVICE IN PARTICULAR FOR LOADING AIRCRAFT, AND METHOD FOR THE PRODUCTION OF A CARGO HOLDING DEVICE

(75) Inventor: Thomas Huber, Schliersee (DE)

(73) Assignee: Telair International GmbH (DE)

(*) Notice: Subject to any disclaimer, the term of this patent is extended or adjusted under 35 U.S.C. 154(b) by 0 days.

(21) Appl. No.: 14/124,015

(22) PCT Filed: Jun. 6, 2012

(86) PCT No.: PCT/EP2012/060713
§ 371 (c)(1),
(2), (4) Date: Dec. 5, 2013

(87) PCT Pub. No.: WO2012/168305
PCT Pub. Date: Dec. 13, 2012

(65) Prior Publication Data
US 2014/0131371 A1    May 15, 2014

(30) Foreign Application Priority Data

Jun. 7, 2011  (DE) .......................... 10 2011 050 893
Jun. 24, 2011  (WO) ................. PCT/EP2011/003114

(51) Int. Cl.
*B65D 19/38*    (2006.01)
*B65D 88/14*    (2006.01)
(Continued)

(52) U.S. Cl.
CPC .............. *B65D 19/385* (2013.01); *B65D 88/14* (2013.01); *B65D 90/08* (2013.01); *B23P 19/04* (2013.01)
USPC ............. 220/1.5; 220/691; 220/682; 206/386

(58) Field of Classification Search
CPC .......... B65D 88/14; B65D 88/12; B65D 7/34; B65D 7/12; B65D 11/18; B65D 7/30; B65D 7/32; B65D 7/24

USPC .......... 220/1.5, 622, 615, 610, 691, 682, 677; 206/600, 386

See application file for complete search history.

(56) References Cited

U.S. PATENT DOCUMENTS

RE22,693 E  * 11/1945  Lindsay .......................... 52/280
3,645,596 A    2/1972  Russell-French
(Continued)

FOREIGN PATENT DOCUMENTS

DE    2064241    7/1971
DE    3409683 A1    9/1985
(Continued)

OTHER PUBLICATIONS

International Search Report with Written Opinion in PCT application PCT/EP2012/060713, dated Nov. 7, 2012.

*Primary Examiner* — Robert J Hicks
(74) *Attorney, Agent, or Firm* — Barnes & Thornburg LLP

(57) ABSTRACT

The invention relates to a cargo holding device, in particular cargo container or pallet, for loading aircraft, comprising a bottom element and a plurality of profile elements and corner elements, wherein a bottom element edge portion is connected to the profile elements and corner elements, wherein the profile elements are connected to the corner elements via push-fit connections, wherein at least one profile element is connected to at least one corner element via a push-fit connection which comprises a push-fit connection recess and a corresponding push-fit connection pin, wherein the push-fit connection recess and the push-fit connection pin are configured such that the profile element and the corner element can be connected together by push-fit by a translational movement, wherein a translational movement direction has an angle in relation to a profile longitudinal axis of the profile element.

28 Claims, 26 Drawing Sheets

(51) Int. Cl.
  *B65D 90/08*  (2006.01)
  *B23P 19/04*  (2006.01)

(56) References Cited

U.S. PATENT DOCUMENTS

| | | | | |
|---|---|---|---|---|
| 4,341,495 | A | * | 7/1982 | Del'Acqua ............... 410/78 |
| 4,538,663 | A | | 9/1985 | Looker |
| 5,941,405 | A | | 8/1999 | Scales et al. |
| 6,112,931 | A | * | 9/2000 | Booth et al. ............. 220/88.1 |
| 2003/0106414 | A1 | | 6/2003 | Wang |
| 2004/0045847 | A1 | | 3/2004 | Fairbank |
| 2008/0145592 | A1 | | 6/2008 | Johnson |
| 2013/0048632 | A1 | * | 2/2013 | Chen ....................... 220/4.33 |

FOREIGN PATENT DOCUMENTS

| | | |
|---|---|---|
| DE | 4218589 A1 | 9/1993 |
| DE | 4331836 A1 | 3/1995 |
| DE | 69702821 T2 | 5/2001 |
| DE | 69616182 T2 | 6/2002 |
| DE | 69630193 T2 | 6/2004 |
| DE | 102008005010 A1 | 10/2008 |
| DE | 102011050893.7 | 12/2012 |
| EP | 0753470 A1 | 1/1997 |
| GB | 2273542 A | 6/1994 |
| JP | 07257683 A | 10/1995 |
| WO | 93/22223 A1 | 11/1993 |
| WO | 03/104088 A2 | 12/2003 |
| WO | 2010/045572 A1 | 4/2010 |

* cited by examiner

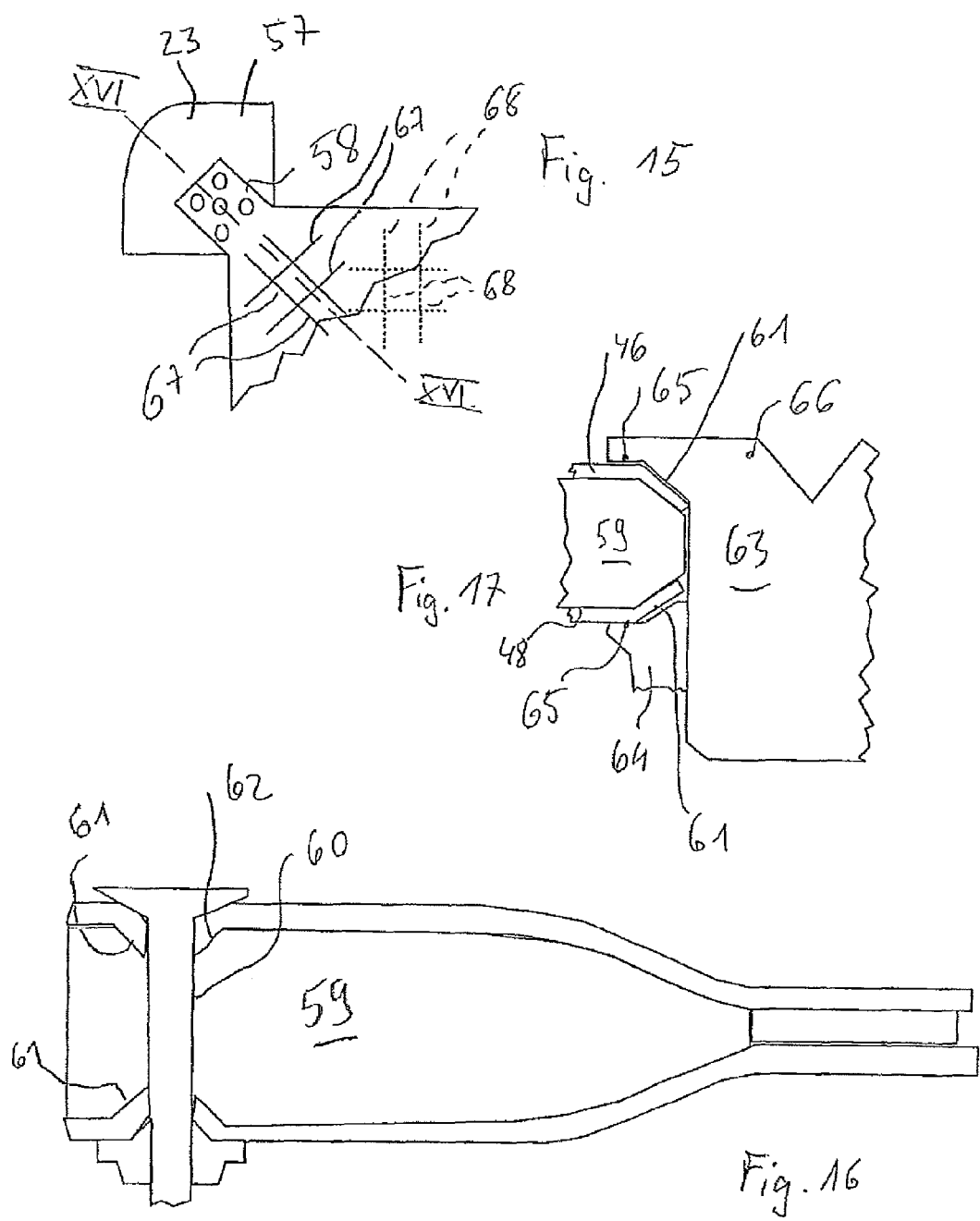

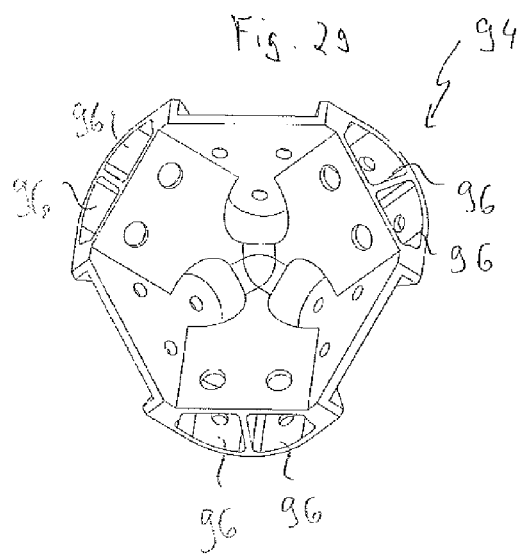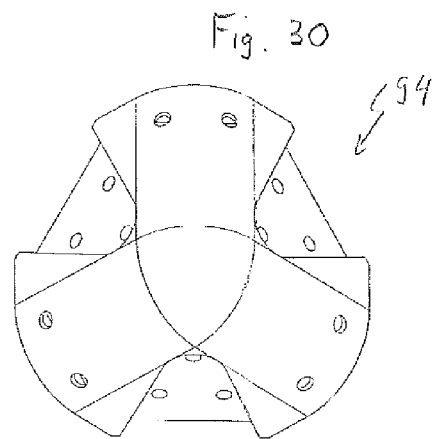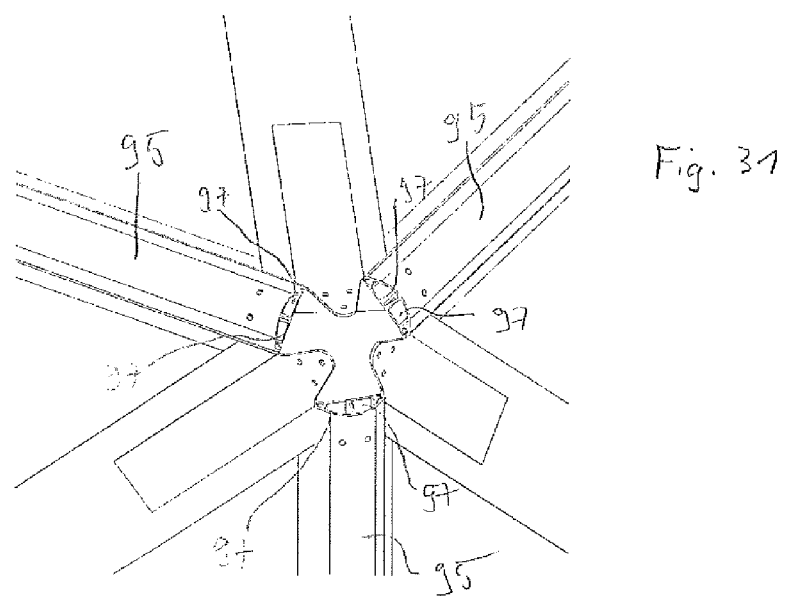

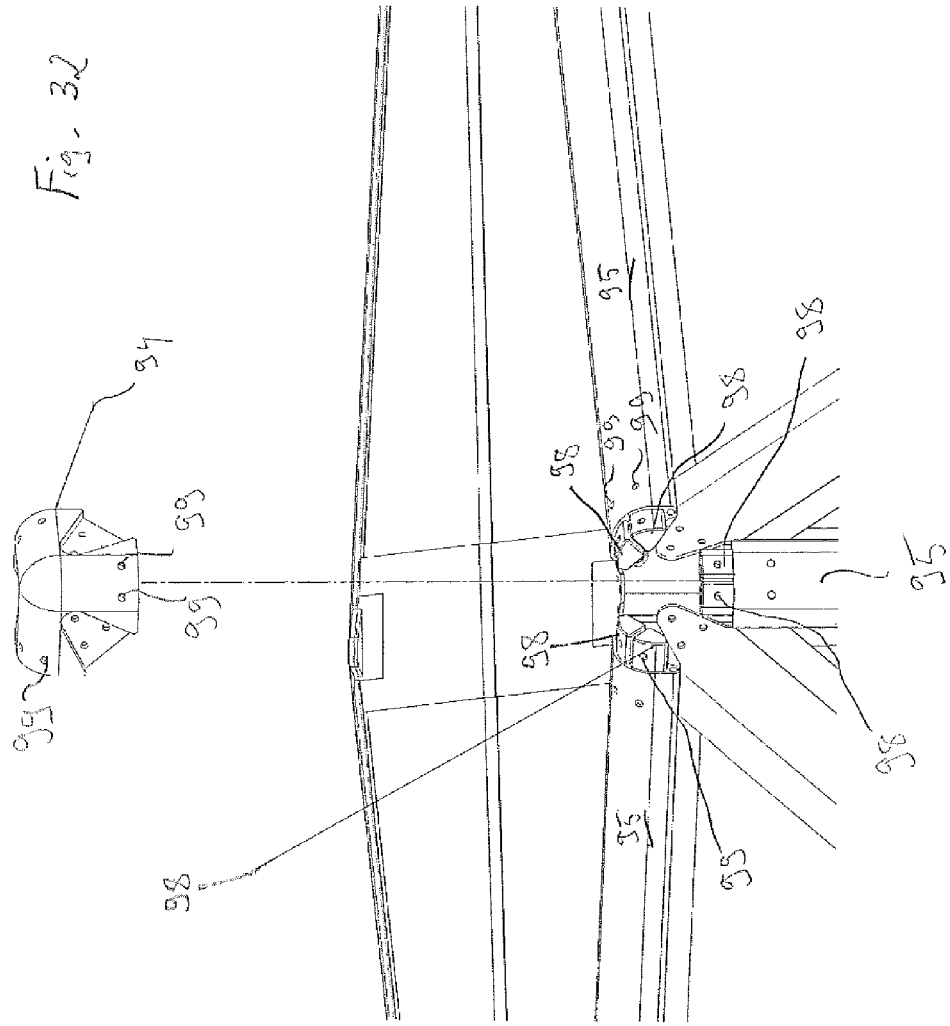

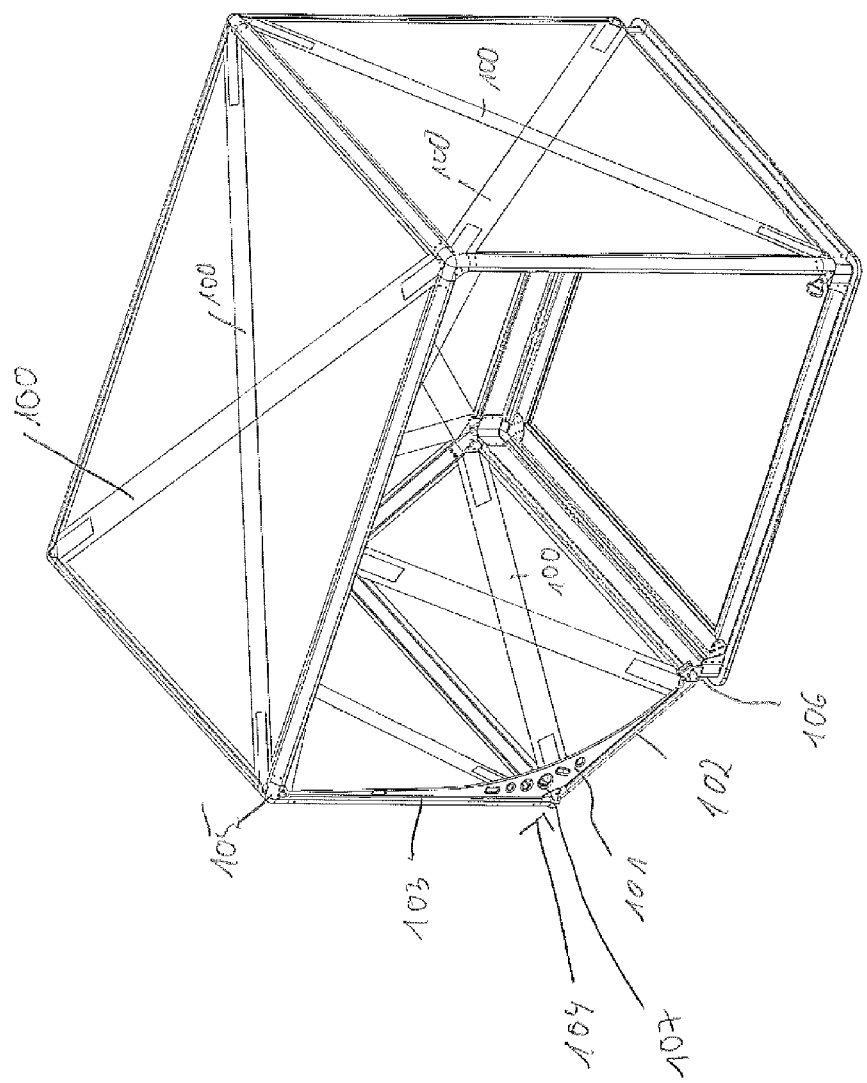

CARGO HOLDING DEVICE IN PARTICULAR FOR LOADING AIRCRAFT, AND METHOD FOR THE PRODUCTION OF A CARGO HOLDING DEVICE

RELATED APPLICATIONS

This patent application is a U.S. nationalization under 35 U.S.C. §371 of International Application No. PCT/EP2012/060713, filed Jun. 6, 2012, which claims priority to German Patent Application No. 10 2011 050 893.7, filed Jun. 7, 2011 and PCT Application No. PCT/EP2011/003114, filed Jun. 24, 2011.

BACKGROUND AND SUMMARY

The present invention concerns a cargo holding device such as a container, pallet or similar, in particular for loading aircraft, and a method for production of a cargo holding device.

Cargo containers and freight pallets—i.e. cargo holding devices—are essential for effective transport of loads in aircraft as they allow rapid loading and unloading of the aircraft. The great majority of commercial aircraft can receive a multiplicity of cargo containers or freight pallets. Most containers or pallets are standardised so they can be used irrespective of the aircraft used for their transport. Until ten years ago, cargo containers were made exclusively of aluminium, wherein the own weight of the container was around 100 kg. Some containers used at present partly comprise lighter materials so that now, cargo containers with a weight of around 60 kg are used. Reducing the own weight of such containers or pallets is extremely important. A cargo container is described for example in DE 20 64 241. The use of non-metallic materials (see DE 696 16 182 T2) in this context has also been considered. DE 696 16 182 T2 proposes for example a cargo container which has a frame of an aluminium alloy in which side walls and a roof of fibre-reinforced plastic are inserted.

DE 34 09 683 A1 describes a cargo container which is made in the manner of a frame. The frame comprises hollow profiles which are connected together via corner connectors. The hollow profiles are pushed onto pin-like arms of the corner connectors. The frame assembly is not described in detail in DE 34 09 683 A1. Because of the formation of the corner connectors and hollow profiles however, it can be assumed that assembly is comparatively complex and in particular entails a bending or deforming of the hollow profiles, at least when the frame is closed.

Starting from said prior art, the object of the present invention is to provide an improved cargo holding device. In particular the production costs and production complexity of the cargo holding device should be reduced and the functionality (e.g. ease of handling) and stability increased. In particular, a frame construction is proposed which can be assembled in a simple manner.

This object is achieved by a cargo holding device according to claim 1. In particular the object is achieved by a cargo holding device, e.g. a cargo container or pallet, for loading aircraft, comprising a bottom element, several profile elements and (separate) corner elements, wherein a bottom element edge portion and/or an edge portion of a side wall is connected to the profile element and corner elements, wherein several profile elements are connected to several corner elements via push-fit connections, wherein at least one push-fit connection comprises a push-fit connection recess and a corresponding push-fit connection pin such that the profile element and the corner element can be connected together by a translational movement, wherein a translational movement direction has an angle in relation to a profile longitudinal axis of the profile element.

An essential concept of the invention is that at least one profile element and corner element are matched to each other such that the profile element and the corner element can be connected together by push-fit, wherein a push movement runs obliquely to the profile longitudinal axis of the profile element. In DE 34 09 683 A1 for example, all profile elements and corner elements can also be attached to each other by push-fit, but because of the concrete design of the elements, only by means of a straight push movement, i.e. the profile element must be moved in relation to the corner element in a direction parallel to the profile longitudinal axis. As the applicant has found, this is because the ends of the profile elements run vertically to the profile longitudinal axis, and end faces of the connection pins of the corner connectors in DE 34 09 683 A1 also run vertically to the profile longitudinal axis (in mounted state). By forming the cargo holding device such that an oblique push movement is possible, the frame can be closed in a simpler manner, in particular no deformation or only a reduced deformation of one profile element (the last profile element) is required. As a result the material choice for the frame is less restricted and the frame as a whole is more stable. Also assembly is simplified in comparison with the prior art.

The push-fit connection pin is preferably an (integral) component of the profile element or corner element. The push-fit connection recess is preferably also an (integral) component of the corner element or profile element. Preferably the movement direction has an angle of greater than 0°, preferably greater than 30°, in particular (around) 40°-50°, for example 45°.

Preferably an inner edge portion of the push-fit connection pin is offset in the profile longitudinal direction in relation to an outer edge of the push-fit connection pin, and/or an inner edge portion of the push-fit connection recess is offset in the profile longitudinal direction in relation to an outer edge portion of the push-fit connection recess. With such an offset, it is possible particularly easily to insert for example the corner element in the profile element by an obliquely inwardly directed, translational movement.

A push-fit connection recess edge or a push-fit connection pin edge can at least in portions have an angle in relation to the profile longitudinal axis of less than 90°, preferably less than 60°, in particular 40°-50°, for example 45°. With such angles (for example an angle of 45°) it is possible particularly easily to move the corner element from the outside obliquely inwards (in the direction of a centre of the cargo holding device) and at the same time connect the corner element to the profile element via the push-fit connection. This reduces the complexity of assembly.

In a concrete embodiment, the push-fit connection recess is open towards the outside. Alternatively or additionally, the inner edge portion of the push-fit connection pin and the outer edge portion of the push-fit connection pin can be at the same height in relation to the profile longitudinal axis. The push-fit connection pin can therefore (in principle) be designed in the same way as in the prior art, namely in DE 34 09 683 A2. If the push-fit connection recess is open not only (as in the prior art) in the direction of the profile longitudinal axis but also (partially) towards the outside, the (conventional) corner connection pin can still be introduced obliquely into the push-fit connection recess.

In a preferred embodiment, the push-fit connection pin is an (integral) component of the corner element and the push-fit connection recess is an (integral) component of the profile element. With such an embodiment, the push-fit connection can be implemented particularly easily and the frame closed.

Preferably the push-fit connection pin is arranged on a pin base surface which runs at least in portions at an angle in relation to the profile longitudinal axis of preferably greater than 0°, preferably greater than 30°, in particular 40°-50°, for example 45°. In this refinement, an end face of the push-fit connection pin preferably runs in relation to the profile longitudinal axis such that the end face of the push-fit connection pin and the pin base surface have an angle to each other. In this embodiment, the pin base surface can serve as a stop surface for a push-fit connection recess edge. A pin base which defines the pin base surface can terminate flush with the profile element. This achieves a simple overall construction which is easy to produce.

Preferably the pin base surface stops on a push-fit connection recess edge. In particular the pin base surface borders the push-fit connection recess edge flush.

In a concrete embodiment, at least one bore is provided in the push-fit connection pin and in a connecting segment defining the push-fit connection recess, wherein the bores align with each other in mounted state. This further stabilises the connection without (substantially) increasing the overall complexity.

The object cited above is furthermore achieved in particular by a cargo holding device, in particular of the type described above, for example a cargo container or a pallet, in particular for loading aircraft, comprising a bottom plate, wherein an edge of the bottom plate and/or an edge portion of a side wall is connected to a plurality of profile elements, wherein the profile elements are connected together via a plurality of push-fit connections, wherein two adjacent profile elements each form a push-fit connection with a third (in the sense of a further) profile element only at their ends facing away from the respective other profile element.

A core concept of this cargo holding device is that a frame in which the bottom element can be received can be formed easily by connecting together a plurality of profile elements. The frame can be closed particularly simply by form fit thanks to the absence of a push-fit connection at two adjacent profile elements. In particular in combination with a hook construction as described further below, the bottom plate can be connected to the profile elements easily and reliably. As a whole, this allows a constructionally simple assembly or dismantling.

Preferably several corner elements are provided which are each connected to two profile elements via a push-fit connection, wherein an end corner element is provided which is connected to maximum one profile element via a push-fit connection. On assembly of the cargo holding device, a frame comprising the profile elements and corner elements can be constructed in a particularly simple manner, wherein because of the special configuration of the end corner element, the frame can easily be closed by form fit (without having to deform the frame). Thus the frame can be produced in a particularly simple manner.

In a concrete embodiment, several corner elements are provided with two push-fit connection pins, one of which can be inserted in a profile element, wherein an end corner element is provided which has maximum one push-fit connection pin.

The embodiment in which two adjacent profile elements form maximum one push-fit connection is preferred in particular in a cargo container. In particular, a corner element without connection pin (which fundamentally weakens the overall structure) can be compensated in that the entire cargo holding device is supported via a connection to further elements (for example vertical walls). Loads can be supported particularly favourably via a connection (bolting) to the vertical walls. In principle such a configuration can be used in a pallet (in which case a different form of connection may be required, for example bolting). However the solution described above is used for preference in a pallet in which the push-fit connection is configured such that an oblique movement direction is possible (when push-fitting together). There is no vertical element in a pallet. However the proposed push-fit connection allows a secure connection between two profiles (meeting at a 90° angle). There is no need for a costly bolted construction. In particular if the corner profiles are connected to the bottom plate by a clip connection, an (almost) bolt-free pallet is achieved, wherein a twisting of the profiles is prevented by the push-fit connection solution.

The object cited above is achieved independently by a cargo holding device, in particular of the type described above, for example a cargo container or pallet, in particular for loading aircraft, comprising a bottom element, profile elements and corner elements, with at least one push-fit connection pin, wherein the push-fit connection pin can be introduced into a corner element and/or into a profile element, wherein the push-fit connection pin is movable in relation to both the corner element and the profile element, in particular along the profile longitudinal direction. This moveability allows the push-fit connection pin for example to be removed or for example inserted in a corresponding push-fit connection recess. This makes the push-fit connection more variable. In particular a frame can be "closed" in a simple manner. Preferably the push-fit connection pin can be fixed (releasably) in relation to the profile element and/or corner element. The push-fit connection pin can thus be locked in relation to the profile element or corner element (for example by bores in the corner element or profile element, wherein a pin or a bolt can be introduced into the bores). Also a frame can be provided, wherein no further elements need be removed in order to exchange a profile or corner element (or further elements such as a wall or tarpaulin). For example an individual element (e.g. tarpaulin or profile element) can be removed from the cargo holding device independently.

In one embodiment, at least one corner element can be composed such that the bottom element edge portion and/or the side wall edge portion can be removed from the profile element, preferably in the direction towards the corner element, while the corner element is connected to at least one profile element. For this, the respective corner element can have a recess (e.g. a groove) which substantially links to the bottom receiving groove and/or side wall receiving groove, and continues the bottom receiving groove and/or side wall receiving groove such that the side wall/bottom element can be removed from the respective profile element while the corner element is connected. To this extent, the side walls and/or the bottom element can easily be removed without the need to dismantle the container completely. Preferably these corner elements are used where the side wall, for example in the form of a loading door or loading tarpaulin, is not connected to all profile elements via grooves. For example, a side wall/loading tarpaulin can be connected to just one profile element. Further connections can be made by hook and loop closure and/or via straps. The side wall/loading tarpaulin can be removed as required using the corner element outlined here.

The object cited above is achieved independently by a method for production of a cargo holding device, in particular a cargo container or pallet, preferably of the type described above, comprising at least one bottom element, several profile elements and several corner elements, wherein at least one profile element and at least one corner element are connected together by push-fit by a translational movement at an angle in relation to a profile longitudinal axis of at least 0°, preferably greater than 30°, in particular 40°-50°, for example 45°. This method features a simple process and results in a stable cargo holding device.

According to an independent concept, a method is proposed, preferably of the type described above, for production of a cargo holding device, in particular of the type described above, comprising at least one bottom element and a plurality of profile elements which are connected to an edge of the bottom element, wherein several profile elements are connected to both adjacent profile elements via a push-fit connection, wherein two adjacent end profile elements are each connected to a third (in the sense of further) profile element only at their ends facing away from each other.

The object above is furthermore achieved by a method, in particular of the type described above, for production of a cargo holding device, in particular of the type described above, comprising at least one bottom element and at least one profile element connected to the bottom element, wherein the bottom element and profile element are brought together at a first predefined angle and then hooked by rotation. With regard to the advantages of the method, reference is made to the cargo holding device described above.

This object is furthermore achieved by a cargo handling device according to this disclosure. In particular the object is achieved by a cargo holding device, preferably of the type described above, e.g. a cargo container or a pallet, in particular for loading aircraft, comprising at least one bottom element and at least one profile element which is connected to the bottom element, wherein at least one end portion of the bottom element is releasably connected to the at least one profile element via a connecting device comprising a hook.

An essential concept of this solution or refinement is that the bottom element can be attached to the profile element by the provision of a hook. This results in a constructionally simple but nonetheless secure connection. Assembly and dismantling of the cargo holding device are facilitated. In particular there is no need for an irreversible gluing or locking.

Preferably a connection can be created between the bottom element and the profile element via a push-fit (of the bottom and/or profile element) with subsequent rotation (of the bottom and profile element in relation to each other). Alternatively or additionally a connection between the bottom element and the profile element can be released via a rotation (of the bottom and profile element in relation to each other) with subsequent separation of the bottom and/or profile element from each other. As a whole, this allows a reliable connection which in particular facilitates assembly and dismantling. Even without the provision of an irreversible gluing or locking, the connection is comparatively reliable (in particular because of the provision of the hook).

In a concrete embodiment, the connection device comprises at least one groove and at least one tongue. The groove can for example be provided in the profile element (and/or in the bottom element). The tongue is preferably provided in the bottom element. Alternatively or additionally, at least one groove is provided in the profile element. Such a tongue and groove connection together with the hook allows extremely simple assembly/dismantling.

A cross-section of the groove and/or the tongue can be round, in particular circular, at least in portions. This allows the profile and bottom element to be rotated in relation to each other particularly easily, which facilitates assembly/dismantling. A cross-section of the groove is preferably completely circular (apart from the groove opening).

At least one tongue and/or at least one groove can be asymmetrical so that the tongue can be introduced into the groove at a predefined first relative angle thereto, and hooked into the groove at a predefined second relative angle (different from the first). In this embodiment, the groove and tongue are formed such that the tongue acts as a hook in the associated groove or is formed as a hook. This refinement is particularly simple in construction and allows a stable connection.

In particular if a cross-section of the groove (apart from a groove opening) is circular, a cross-section of the tongue can have a length (maximum length) in a longitudinal direction and a width (maximum width) in a width direction, wherein the longitudinal direction stands perpendicular to the width direction, wherein the length is greater than the width (for example at least 1.1 times or at least 1.3 times or at least 1.6 times as great). The connection to the groove can be made simply and securely with such an oblong (in cross-section) tongue.

Preferably a cross-section of the tongue has a circle arc portion and a rotation-support protrusion (fulcrum) opposite the circle arc portion. With such an embodiment, the tongue can be levered into the groove particularly easily by rotation, thus allowing assembly and dismantling.

Preferably an edge portion of the bottom plate and/or at least one profile element edge portion facing the edge portion of the bottom plate is hooked shaped (in cross-section). With corresponding formation of the edge, there is no need for a separate component (for example a separate hook). The connection can therefore be made constructionally extremely simply.

At least one bottom plate edge portion of the bottom plate can be bent inwards. Alternatively or additionally, at least one profile element edge portion facing the bottom plate edge portion can be chamfered downwards in the direction of the bottom plate. In an embodiment of the cargo holding device as a pallet, "inwards" can mean that the bend is oriented in the direction of a cargo holding surface. For a container, "inwards" can mean that the bend is oriented in the direction of a middle of the cargo holding space. In any case, this allows a stable and in particular form-fit design of the bottom. The material usage is here particularly low. The connection between the bottom element and the profile element is nonetheless reliable and secure.

The bottom plate and/or at least one, preferably pultruded, profile element can be made of fibre-reinforced carbon, at least in portions. This allows firstly a weight saving. In particular in the case of production by pultrusion, the advantage results that the hook construction is extremely stable against a tensile load from the bottom element thanks to the orientation of the fibres of the profile element along its longitudinal axis.

In a concrete refinement, at least one wall element and at least one profile element are fitted with a slot wherein an edge, in particular widened, preferably peripheral, of the wall element is or can be pushed into the slot. With such a design, tensile loads can be transmitted at right angles to an edge of the wall (tarpaulin) within one tarpaulin layer. By synergy effect in combination with the construction and assembly of the bottom element, this allows a simple but nonetheless stable construction of the entire cargo holding device. The wall element serves in a simple manner as a structural element for the entire cargo holding device. This allows an even lighter frame construction and the omission of separate connecting means, such as rivets and bolts.

Preferably at least one wall element is provided which has a stiffening element, in particular comprising an additional wall layer (tarpaulin layer), running from one wall corner to the diagonally opposite wall corner. Further preferably, stiffening elements run from all four wall corners to their diagonally opposite wall corners, so that as a whole a cross-shaped stiffening element is formed. The at least one stiffening element can be implemented by a (local) increase in the number of layers (number of tarpaulin layers). The stiffening elements allow tensile loads to be absorbed at corner points so that they need not (any longer) be dissipated via the frame profiles. In particular in combination with the bottom element described above, a construction is achieved which is extremely lightweight and simple to assemble. Any push-fit connections or hook connections provided are stabilised by the stiffening elements. With this measure, the at least one wall element becomes a structurally reinforcing element for the entire cargo holding device. This allows a lightweight construction (frame construction) and the omission of separate connecting means such as rivets and bolts.

According to a refinement which is also claimed independently, the object is also achieved by a cargo holding device such as a container, pallet or similar, in particular for loading aircraft, wherein the cargo holding device comprises at least one bottom element and at least one pultruded profile element of fibre-reinforced plastic.

An essential concept of this refinement or independent aspect is to use a profile element of fibre-reinforced plastic, which is produced in the pultrusion process (extrusion-drawing process), to stabilise the cargo holding device. Because of the pultrusion process, the profile element of fibre-reinforced plastic is given a resistance, in particular against a bending load, which cannot be achieved by conventional methods for processing fibre-reinforced plastic (for the same material usage). As a whole therefore a stable construction of a cargo holding device is possible with lower material usage. This means that the weight of a cargo holding device can be further reduced substantially. Furthermore an efficient production is ensured.

Preferably at least one profile element is formed as a hollow profile, at least in portions. This allows a further weight reduction for the same or increased stability.

At least one profile element can form at least one part of a frame of the cargo holding device, in particular of the bottom element. Forces which act on the frame in such a cargo holding device can be distributed to the frame particularly favourably thanks to the pultruded design of the profile element.

At least one profile element can comprise at least one fixing device, such as for example a push-fit device, in particular a preferably round groove or a rail, for fixing a wall element, in particular a bottom element and/or a lashing device. In particular a groove or rail can be produced in the pultrusion process at little cost. This offers a weight-saving possibility for connecting different wall elements to the profile element in a simple manner. In particular if the profile element is formed as part of a frame, the cargo holding device can be assembled, dismantled and repaired in a simple manner.

In concrete embodiments, the profile element can be connected with a further profile element and/or a corner element via a push-fit connection. In particular, the push-fit connection between two profile elements can be implemented via a corner element. The push-fit connection between two profile elements can however also be made directly such that the profile elements are in contact. Two or more profile elements can also be assembled into an extended profile element via one or more (straight) intermediate piece(s). Thus in a simple manner, various profile elements can be produced or the size of the cargo holding device can easily be adapted.

In a preferred embodiment, at least one corner element is provided for connection, in particular push-fit connection, of two profile elements. The at least one corner element can have at least one pin (extension) corresponding to a recess of the profile element. In the embodiment of the profile element as a hollow profile, the pin (extension) preferably corresponds in cross-section to the cross-section of a hollow chamber of the hollow profile. This again facilitates production of the cargo holding device.

Preferably at least one (in some cases, tarpaulin-like) wall, in particular a side wall or top, is produced at least in portions from a fibre-reinforced plastic. In conjunction with the pultruded profile elements, as a whole an extremely lightweight cargo holding device can be achieved with high stability.

At least one wall, in particular a bottom wall or a cargo floor, can comprise a core layer of fibre-reinforced plastic and a seating layer (support layer) of a metal, in particular an aluminium alloy, wherein the core layer and seating layer are joined together preferably by material fit. An essential concept of this embodiment is to reduce the weight, for example of the cargo floor, in that this is made in several layers, in particular in a sandwich construction, wherein materials of metal and plastic are used for the layers. The bottom wall can be constructed as explained in German patent application file ref. DE 10 2011 050 893.7 and/or produced accordingly. Materials of metal and plastic can be used for the layers. Predefined requirements, e.g. with regard to friction and wear behaviour, can be taken into account here, wherein as a whole a very stable composite material or laminate is produced.

Preferably the layers are joined together by material and/or form fit, where a material fit join leads to particularly good results.

Preferably the seating layer of metal alloy serves as an outer layer for the action of cargo drive units. Furthermore this layer absorbs spot loads and distributes them over a broad area. An aluminium alloy is particularly suitable here since in conjunction with conventional rollers of cargo drive units, this gives a good coefficient of friction. The core layer, which preferably connects directly to the seating layer, stiffens the entire construction and leads to substantial weight savings.

The seating layer can have a thickness of 0.5 mm to 2.5 mm, in particular 0.7 mm to 1.5 mm, in particular 0.9 mm to 1.5 mm. Preferably the seating layer has only a slight thickness in relation to the thickness of the entire cargo floor, e.g. less than 40%, in particular less than 30%, in particular less than 20% of the total thickness. To this extent, significantly lighter cargo floors can be produced.

The seating layer can have a strength of more than 400 N/mm$^2$, in particular more than 500 N/mm$^2$. To this extent the seating layer can protect the core layer from high spot loads. The cargo floor according to the invention wears only slowly under the usual rough handling, and is very robust.

It is possible to design the cargo floor in a laminated structure with only two layers. Preferably however a further layer, namely a wearing layer or top layer, can be provided which is arranged on the side of the seating layer facing away from the core layer.

The wearing layer can be made of metal alloy, in particular an aluminium alloy, and/or a glass fibre-reinforced plastic and/or a material from the group of aromatic polyamides (e.g. aramide). The wearing layer can protect the core layer from wear and stiffen the sandwich construction as a whole.

Said aluminium alloys for the seating layer and/or the wearing layer can be aluminium wrought alloys. The main alloy element used can be zinc, wherein zinc accounts for a proportion of 0.7 to 13%, in particular 0.8 to 12%. Such aluminium alloys are very hard. For example 7075 T6 or 7075 T7 can be used as a material.

Preferably the wearing layer is also connected to the core layer by form and/or material fit.

Said aluminium alloys can be aluminium alloys with a solution-hardened and/or thermally hardened and/or over-hardened heat treatment, to ensure an adequate strength.

The core layer can have a thickness of at least 1 mm, in particular at least 1.5 mm, in particular at least 2 mm, in particular at least 4 mm, in particular at least 6 mm.

Preferably the core layer comprises a solid core. According to the application, a solid core is a core which is substantially solid. This means that the core layer comprises at least 50%, in particular at least 70%, in particular at least 90% carbon-fibre-reinforced and/or glass-fibre-reinforced plastic. There are no large cohesive cavities, in particular honeycomb structures or similar.

The wearing layer can have a thickness of 0.1 mm to 1 mm, in particular 0.2 mm to 0.6 mm, in particular 0.25 mm to 0.5 mm.

Preferably at least one wall has, at least in portions, an in particular rounded bead on its edge for fixing the wall to at least one profile element. As a result, a connection to the profile element or one of the profile elements can be achieved particularly easily, in that for example the bead is inserted in a (round) groove of the profile element.

At least one wall, in particular the bottom wall, can be bent inwards on at least one edge region. In an embodiment of the cargo holding device as a pallet, "inwards" can mean that the bend is oriented in the direction of a cargo holding surface. For a container, "inwards" can mean that the bend is oriented in the direction of a middle of the cargo holding space. In any case, as a result (in particular in combination with a round bead on the edge of a wall) a stable and in particular form-fit structure of the wall, in particular the bottom, can be achieved. The material usage is here particularly low.

At least one wall can have at least two layers of fibre-reinforced plastic, wherein a lay angle of a first layer is offset to a lay angle of a second layer by at least 30° and/or maximum 90°, in particular by 45° or 90°.

At least one wall can comprise at least one first layer with (exclusively) 0°/90° layers and at least one second layer arranged on the first layer with (exclusively) −45°/+45° layers. Reference is made here to a predefined longitudinal edge of the cargo holding device. Because of the two layers, it is possible to achieve easily both stabilisation in a corner region (by the −45°/+45° layers) and a stable fixing to the profile elements running for example along the edge (by the 0°/90° layers).

At least one wall can be made at least in portions from glass-fibre-reinforced plastic and/or carbon-fibre-reinforced plastic and/or aramide and/or Kevlar.

Preferably aramide/Kevlar is used in particular to improve the handling for example with forklift trucks. Alternatively, a film could be drawn over (conventional) cargo holding walls or pallets, on the outside of the cargo holding device. A thin outer layer can be introduced (on production of the walls) (for example as a further layer). In a refinement, the cargo holding device or pallet can be designed to reflect sunlight (without a protective sleeve necessarily having to be provided). A sunlight-reflecting layer can therefore be used instead of a protective sleeve. This is advantageous insofar as protective sleeves can often only be used once in the prior art, since they are damaged after first use (for example holes are created etc.).

At least one edge bead can be formed by a rod integrated into the edge, in particular a rod made of fibre-reinforced plastic, such as glass-fibre-reinforced plastic or carbon-fibre-reinforced plastic. Thus a connection to a fixing device of a profile element can be achieved in a simple manner.

Preferably at least one wall is attached to a/the frame of the cargo holding device via at least one corner plate, wherein the corner plate has preferably at least one bore, in particular a bore at least partly lined together with the wall. Further preferably, at least one in particular tarpaulin-like wall is attached to a frame of the cargo holding device via at least one plate, wherein the plate preferably has at least one bore, wherein further preferably at least one layer of the in particular tarpaulin-like wall is pressed into the bore. Thus with a suitable fixing means with preferably cylindrical cross-section, for example a bolt, a simple and secure fixing can be ensured of the in particular tarpaulin-like wall. For this it is furthermore advantageous if the fixing means has a flange portion. The in particular tarpaulin-like wall can be clamped between this flange portion and the profile element, further improving the stability.

The plate can be arranged at least in portions inside the wall and preferably be tapered in the direction of the wall centre. This gives a comparatively homogeneous transition region from the plate to the in particular tarpaulin-like wall (in the region in which this is not connected to the plate). This further improves the stability of the fixing. The weight is reduced.

The object cited above is also achieved, according to a refinement of the method described above (which also constitutes an independent aspect and is claimed as such), with a method for production of a cargo holding device, in particular of the type described above, comprising at least one profile element, wherein the profile element is made at least in portions by pultrusion of fibre-reinforced plastic. With regard to the advantages of the method, reference is made to the cargo holding device described above. A central advantage of this method is the possibility of producing cargo holding devices with substantially reduced own weight.

At least one wall of the cargo holding device can be made from an in particular tarpaulin-like, fibre-reinforced plastic, wherein the wall can be pressed in portions into a bore of the fixing plate, preferably using a tool with a conical portion. Thus the wall of fibre-reinforced plastic can be fixed to the profile element particularly securely.

Preferably the production method comprises production of a groove on the at least one profile element, preferably by pultrusion, and connection of the at least one wall to the at least one profile element by the introduction of a bead-like portion of the wall into the groove.

In a preferred embodiment, the production method comprises a push-fit connection of a plurality of profile elements to create a frame, in particular using corner elements.

Preferably the frame is pretensioned by attachment of a/the wall to the frame.

The object cited above is furthermore achieved independently by the use of a pultruded profile element of fibre-reinforced plastic for the production of a cargo holding device, in particular of the type described above.

The present cargo holding device requires no metal components at all. In a concrete embodiment, the cargo holding device can comprise an electromagnetic transmitter and/or receiver, in particular an RFID chip. Thanks to the absence of metal components, or at least a reduction in the proportion of metal components, this electromagnetic receiver and/or transmitter device can communicate particularly easily with a corresponding external transmitter or receiver. Interference by metal components is avoided or at least reduced.

As a whole, due to the special construction of the cargo holding device, the weight is reduced further significantly in comparison with known cargo holding devices. A weight reduction of 35% or more appears possible, which for example in the case of a Boeing 747 could be around 640 kg per total load weight in comparison with loading with known containers. If we assume that a Boeing 747 with maximum load consists of around one-third aircraft, one-third passengers or freight, and around one-third fuel, and in this form has a take-off weight of around 408 tonnes, the result is that around 130 tonnes of fuel are required to transport 272 tonnes of aircraft and load. With the cargo holding device according to the invention, in such a case around 320 kg fuel can be saved on each flight. As a result, the $CO_2$ emissions can be further reduced substantially.

The term "side wall" can also mean a top wall (e.g. cover element) or a wall which is oriented upwards, or parallel or inclined in relation to the bottom element.

BRIEF DESCRIPTION OF THE DRAWINGS

The invention is now described below with reference to several exemplary embodiments which are explained in more detail with reference to the drawings which follow.

The drawings show:

FIG. 15 a fixing of a wall of the cargo holding device to a corner element in a top view;

FIG. 16 a partial section along line XVI-XVI of FIG. 15;

FIG. 17 an alternative possible configuration of a region of the fixing of the wall to the corner element in a diagrammatic section;

FIG. 29 an alternative embodiment of a corner element in a first view;

FIG. 30 the embodiment of the corner element according to FIG. 29 in a second side view;

FIG. 31 an extract of parts of a corner region of a cargo holding device;

FIG. 32 an alternative extract of parts of a corner region of a cargo holding device; and FIG. 33 an alternative configuration of a cargo container.

DESCRIPTION

Figure 1:
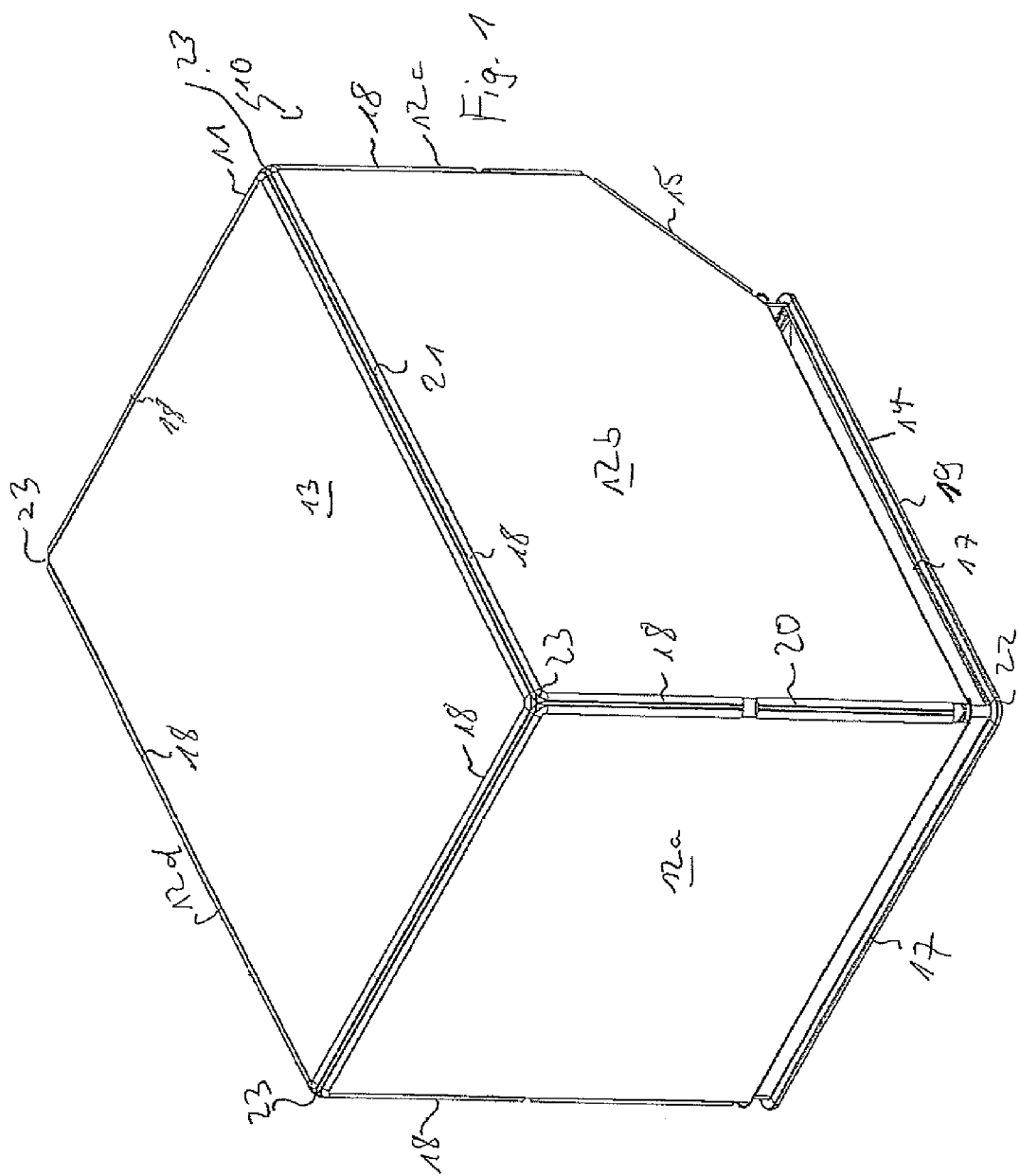
FIG. 1 a diagrammatic view of a cargo container in an oblique view.

In the description which follows, the same reference numerals are used for parts which are the same and parts which have the same effect.

Figure 2:
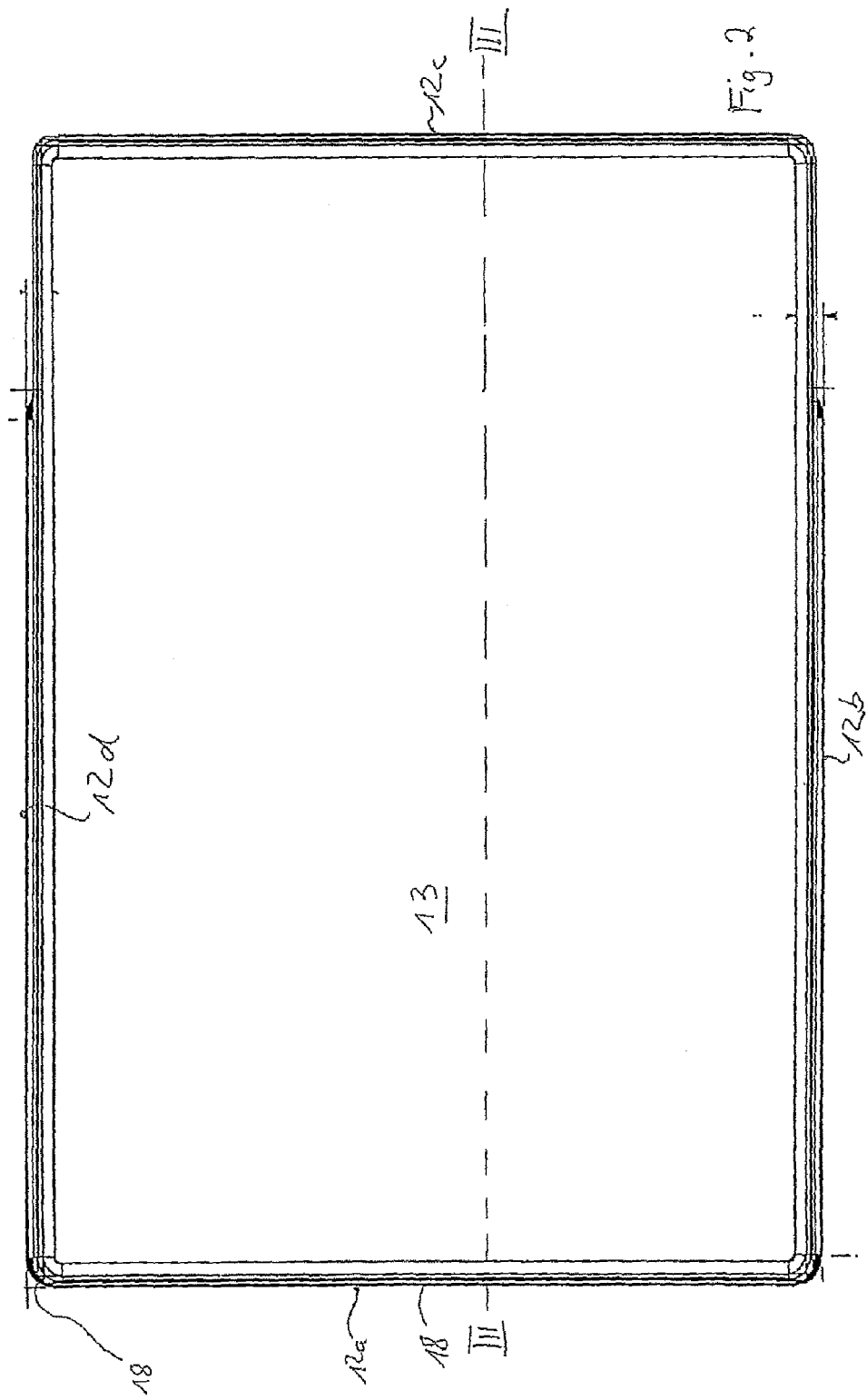
FIG. 2 the cargo container from FIG. 1 in a top view.

FIG. 1 shows a cargo container 10 in an oblique view. FIG. 2 shows the cargo container in a top view. The cargo container 10 comprises a frame 11 and (attached to the frame) side walls 12*a* to 12*d*, a top 13 and a bottom 14. The side wall 12*c* runs obliquely outward at the bottom 14 (at a 45° angle). As well as this oblique portion 15, the side wall 12*c* has a vertical segment 16 which runs to the top 13. The other side walls 12*a*, 12*b* and 12*d* run vertically throughout in relation to the bottom 14 or the top 13.

The frame 11 comprises first profile elements 17 and second profile elements 18, wherein the first profile elements 17 and the second profile elements 18 differ in particular in their cross-section. The first profile elements 17 are part of a bottom frame 19. The second profile elements 18 are part of a side frame 20 and a top frame 21.

Bottom corner elements 22 are integrated in the bottom frame 19. Two first profile elements 17 and a second profile element 18 can be attached to the bottom corner elements 22. The side frame 20 and the top frame 21 comprise side corner elements 23 to which the three second profile elements 18 can be attached (by push-fit).

Figure 3:
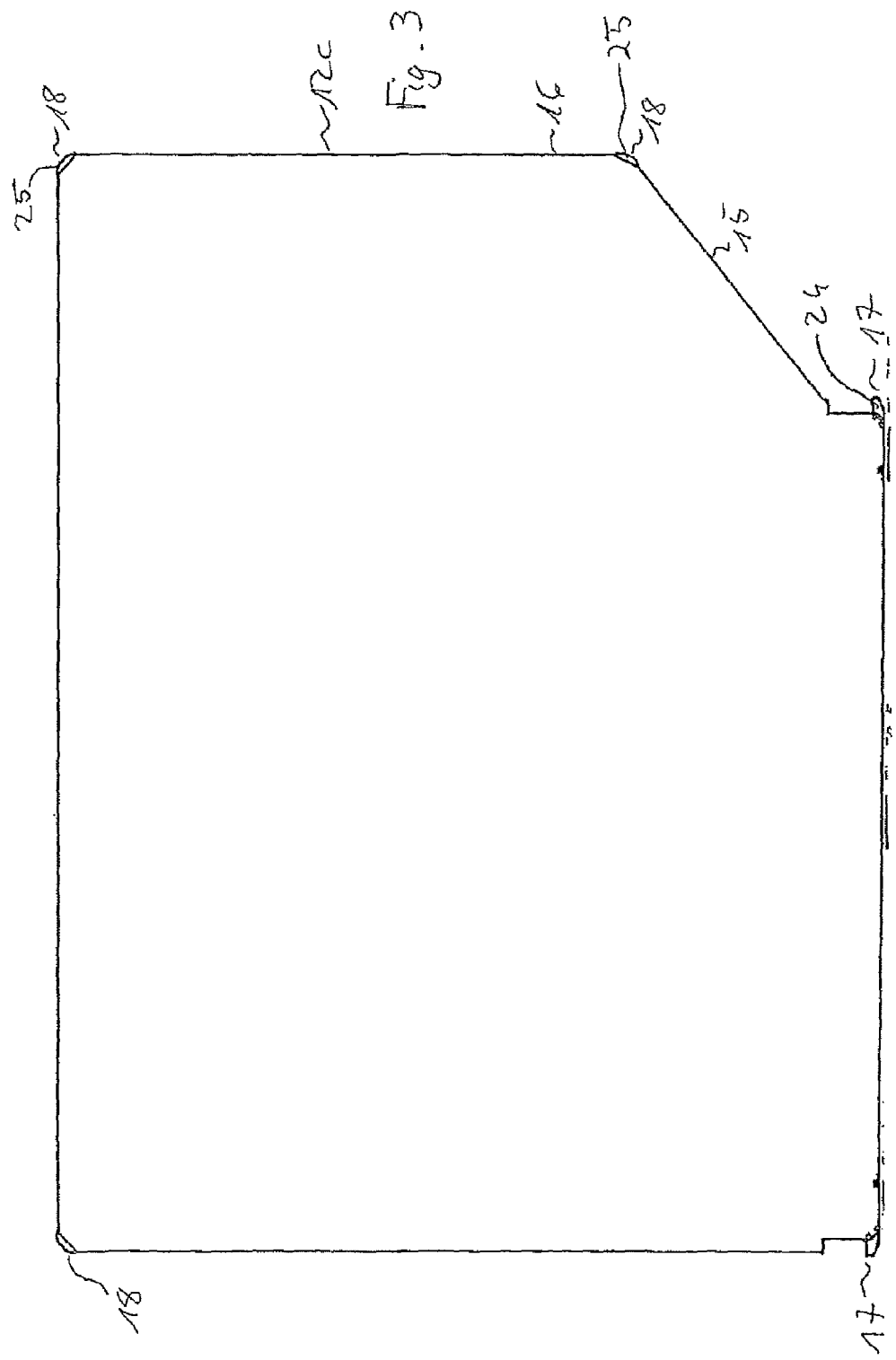
FIG. 3 the cargo container in a section view along line III-III of FIG. 2.

FIG. 3 shows a section along line III-III from FIG. 2. It is clear that a second profile element 18 is also arranged between the oblique portion 15 and the vertical portion 16 of the side wall 12*c*. It is furthermore evident that the first profile element and the second profile element are formed as hollow profiles, wherein a cavity 24 of the first profile element 17 and a cavity 25 of the second profile element 18 are formed differently.

Figure 4:
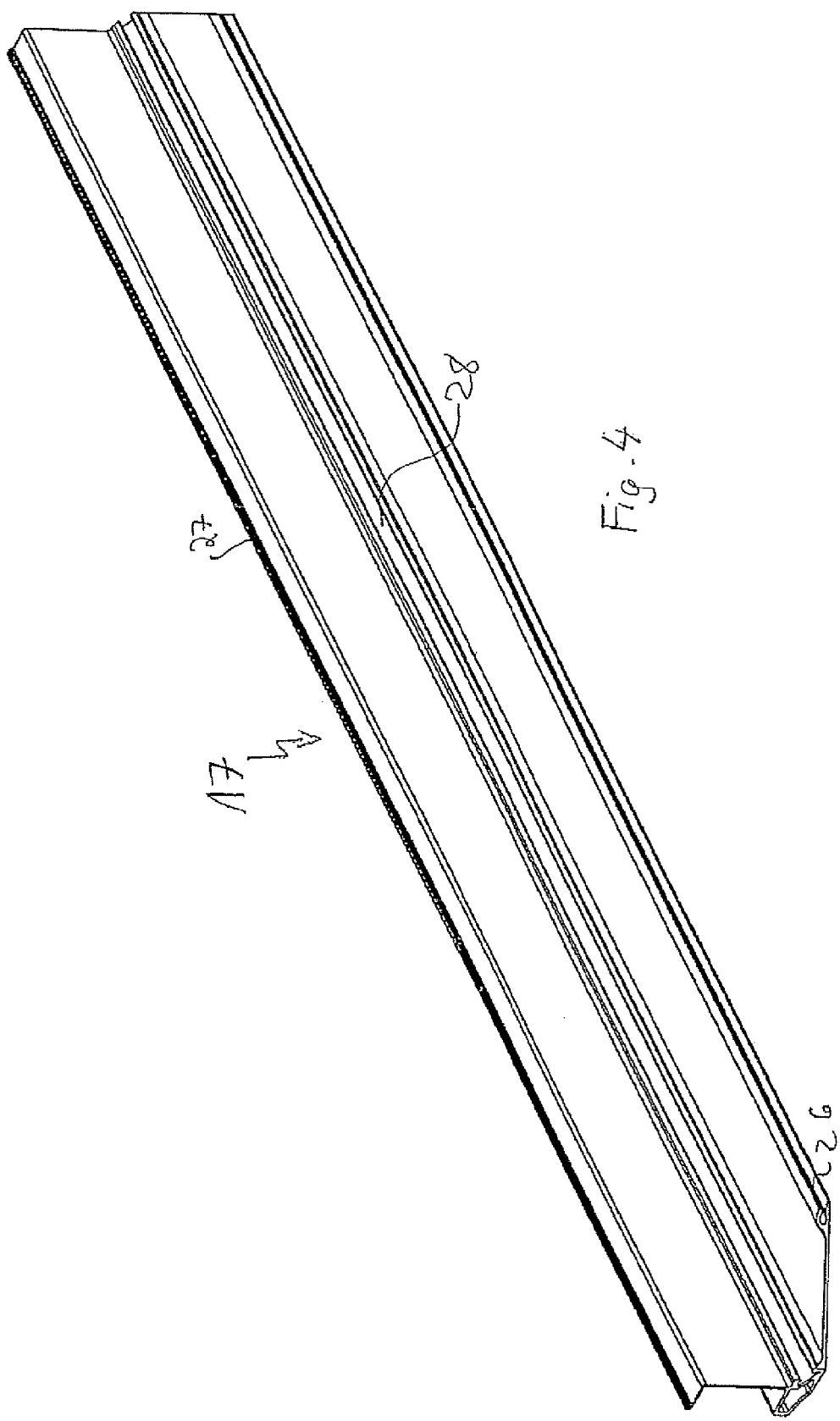
FIG. 4 a pultruded profile element in an oblique view.
Figure 5:
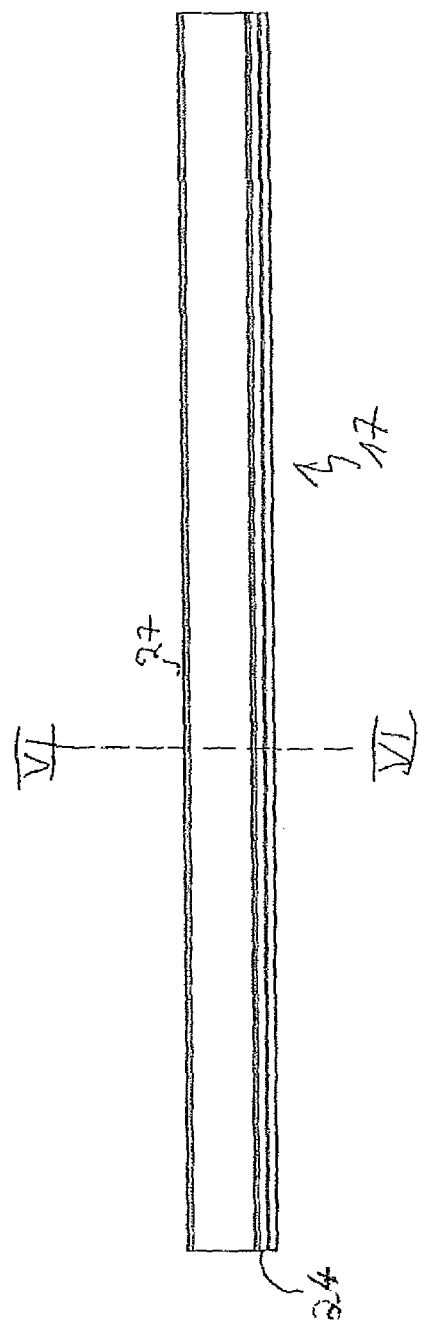
FIG. 5 the pultruded profile element according to FIG. 4 in a side view.
Figure 6:
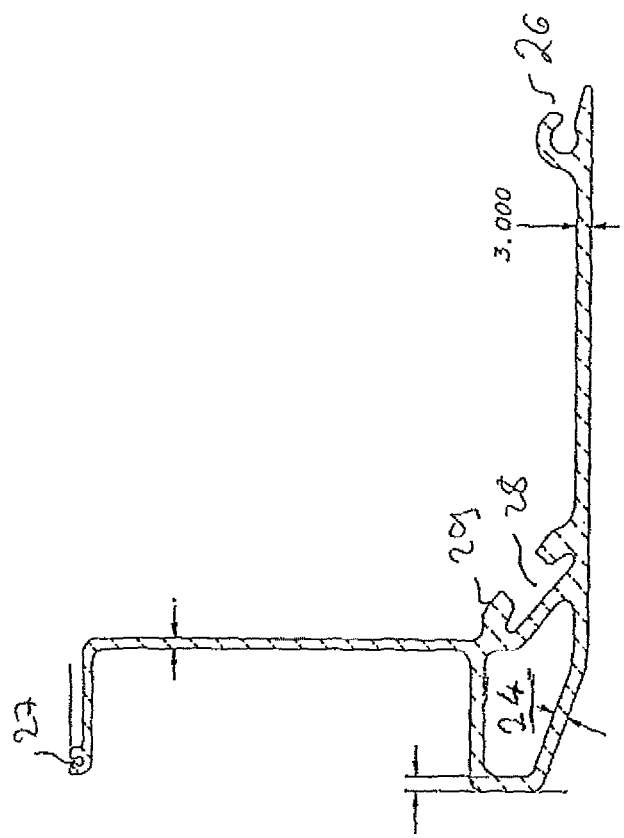
FIG. 6 a section along line VI-VI of FIG. 5.

FIG. 4 shows a profile element in an oblique view. FIG. 5 shows the profile element in a view from the side. FIG. 6 shows a section along line VI-VI from FIG. 5. As evident from FIGS. 4 and 6, the first profile element 17 comprises a bottom receiving groove 26 to receive or fix the bottom 14, and a side wall receiving groove 27 to receive or fix one of the side walls 12*a* to 12*d*, and a seat rail construction 28 for the introduction (hooking) of lashing eyes for the load.

In concrete terms, the bottom 14 or a bottom plate can be inserted in the bottom receiving groove 26. Because the bottom receiving groove is provided, no additional connecting pieces such as rivets for example are generally required. This significantly reduces both the structural complexity and the difficulty of assembly.

Side walls 12a to 12d can also be inserted in the side wall receiving groove 27. The bottom receiving groove 26 and/or the side wall receiving groove 27 preferably has a round cross-section and is suitable for holding a round bead (see below) of the bottom 14 or one of the side walls 12a to 12d or the top 13.

The seat rail construction 28 has an oblong cross-section with inwardly curved hook 29 to retain lashing eyes.

The cavity 24 of the first profile element (see FIG. 6) has an (approximately) rectangular cross-section, wherein a wall adjacent to the bottom 14 (not shown in FIG. 6) is bent up towards the outside. In particular, the inner contour of the profile element 17, 18 can vary; an outer contour can also vary, where applicable taking into account the cargo system. The inner cross sections can in particular be adapted to different loads. The outer contour can be adapted to the interface to the cargo system, for example edge corners can be configured to receive locking bolts and guides.

The bottom corner elements 22 can be extended and/or widened (in the vertical direction) with a flange plate (not shown in figures) in particular to be able to connect the first profile elements to the bottom corner elements 22 by bolting. The bottom corner elements 22 (where applicable also the side corner elements 23) can be made of a composite material (in particular a fibre composite material) or where applicable also from an aluminium alloy (cast or forged). If the corner elements comprise a metal alloy, corrosion protection can be provided between the pultruded profile elements and the corner elements (since for example carbon-fibre-reinforced plastic is comparatively aggressive towards aluminium).

The seat rail construction 28 can comprise bores (not shown in the figures) (wherein the bores can be machined subsequently and have a diameter of 19 mm) for attaching or hooking in lashing eyes (single tie-down and double tie-down studs), for example if heavy loads are to be flown in the cargo container which must be lashed additionally inside the container 10. In the case of pallets, these bores could be located all around the inside, for example for attaching pallet nets to the pallets. Previously, normally aluminium part pieces were screwed or riveted on for this. This seat rail construction 28 is integrated in the present profile element, and also preferably made of pultruded fibre composite plastic (such as carbon-fibre-reinforced plastic or glass-fibre-reinforced plastic etc.).

Figure 7:
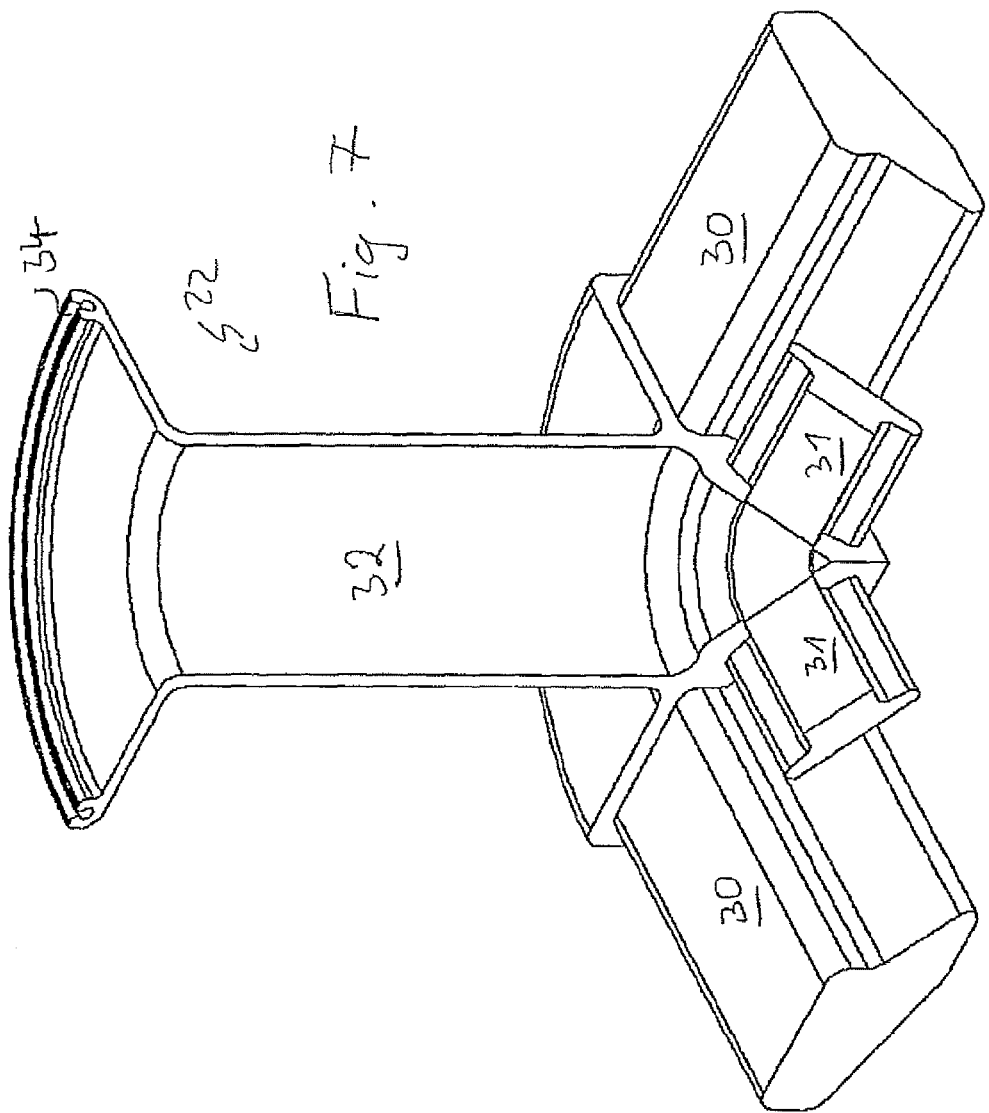
FIG. 7 a corner element in a first oblique view.
Figure 8:
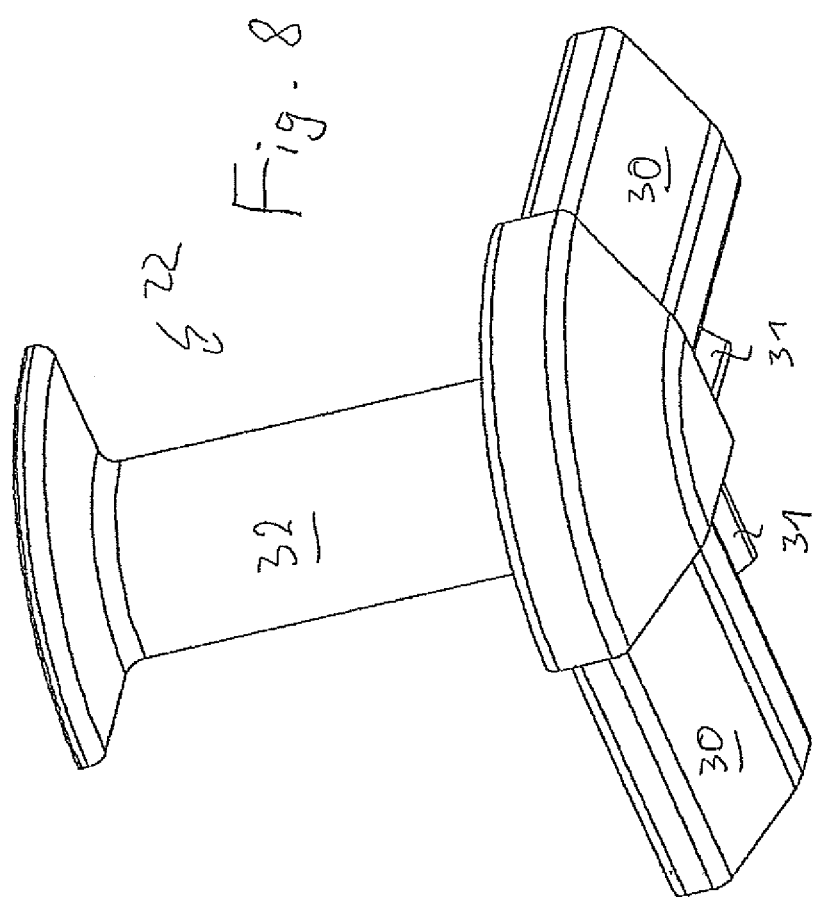
FIG. 8 the corner element from FIG. 7 in a second oblique view.

FIGS. 7 and 8 show one of the bottom corner elements 22 in various oblique views. The bottom corner element 22 is formed for connection (by push-fit) with two first profile elements 17. For this, two cavity receiving pins 30 are formed, onto each of which a cavity 24 of the first profile element (not shown in FIGS. 7 and 8; see FIG. 6) can be pushed. To this extent, an outer contour of the cavity receiving pins 30 corresponds to an inner contour of the cavities 24 of the first profile elements 17. Furthermore, seat rail receiving pins 31 are provided which are configured to be inserted in the seat rail construction 28 of the first profile element 17. To this extent, an outer contour of the seat rail receiving pins 31 corresponds preferably to an inner contour of the seat rail construction 28. This not only allows the seat rail construction 28 to serve for lashing (securing) the object to be transported but also contributes to further stabilisation of the cargo container 10. As a result further material can be saved, which reduces the overall weight. According to an independent concept, a cargo holding device is proposed in which at least one connection element for connecting two profile elements has at least one seat rail receiving pin, which can be introduced into a seat rail construction of a (pultruded) profile element.

The bottom element 22 comprises a side wall web 32 which extends in the direction of the side walls 12a to 12d (not shown in FIGS. 6 and 7). A (horizontal) portion is provided with an arcuate groove 34 at a distal end 33 of the side wall web 32, in order to be able to attach the side walls 12a to 12d to the first profile element 17. In assembled state (see FIG. 1), the arcuate groove 34 transforms into the side wall receiving grooves 27 of the first profile element 17.

Figure 9:
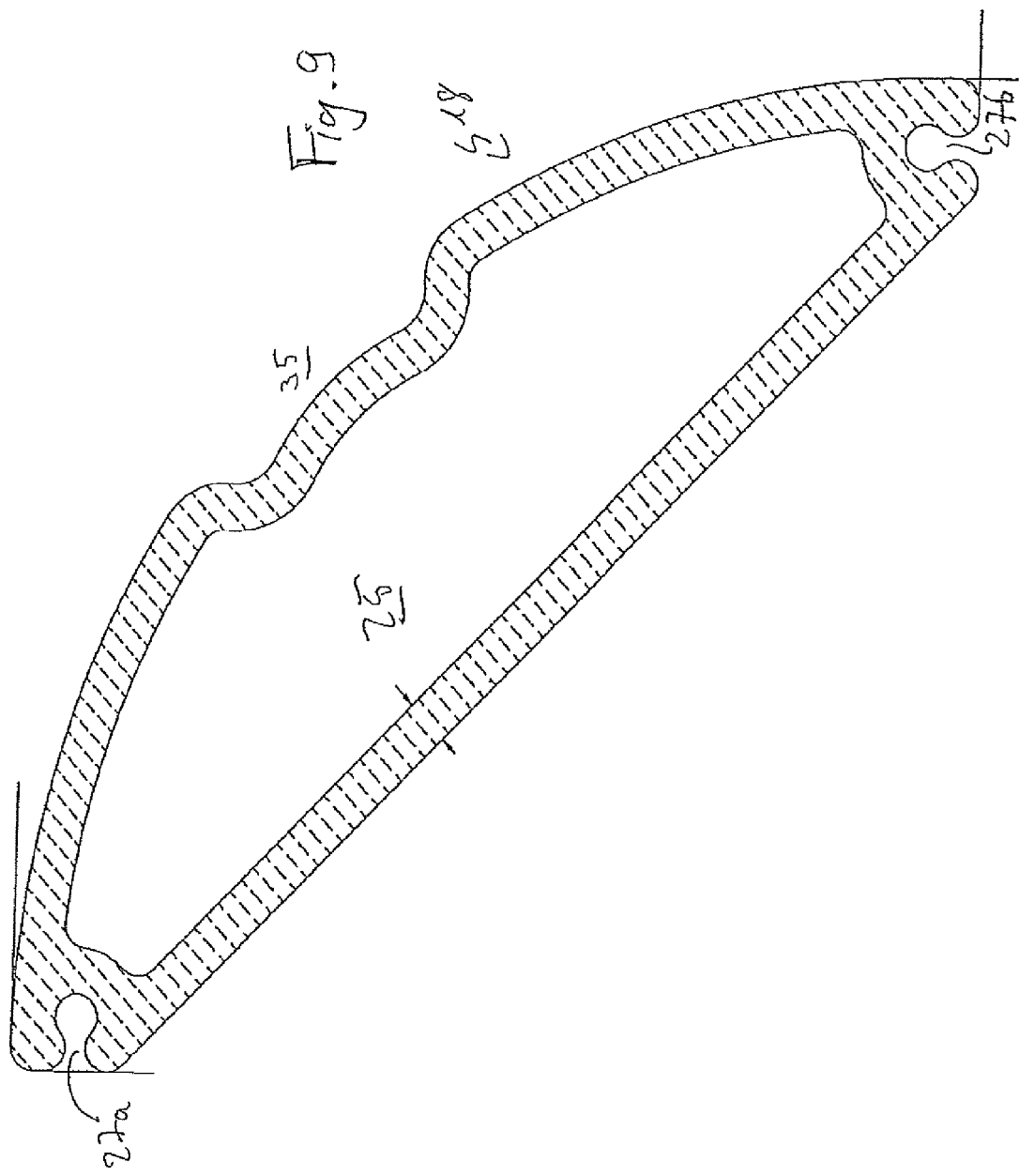
FIG. 9 a second embodiment of a pultruded profile element in a diagrammatic section view.

FIG. 9 shows a cross-section of the second profile element 18 which is preferably used on all edges of the container (except the edges towards the bottom 14). The side walls 12a to 12d and the top 13 can be connected to the second profile elements preferably by pushing (via a butt-joint). Here again, no complex connection process is required, such as for example riveting.

The second profile element according to FIG. 9 comprises a first side wall receiving groove 27a and a second side wall receiving groove 27b, in order to be able to connect two side walls 12a to 12d or one of the side walls 12a to 12d to the top 13. The side wall receiving grooves 27a and 27b also have an (approximately) round or circular cross-section and are suitable for receiving a bead of the side walls 12a to 12d or the top 13. The cavity 25 of the second profile element 18 is formed (approximately) as a circle segment and has a recess 35 in the region of a circle arc. The cross-section of the second profile element also depends in particular on the loads to be held, which may vary. To this extent, the cross-section of the cavity 25 or the second profile element 18 may also deviate (from the shape shown in FIG. 9).

Figure 10:
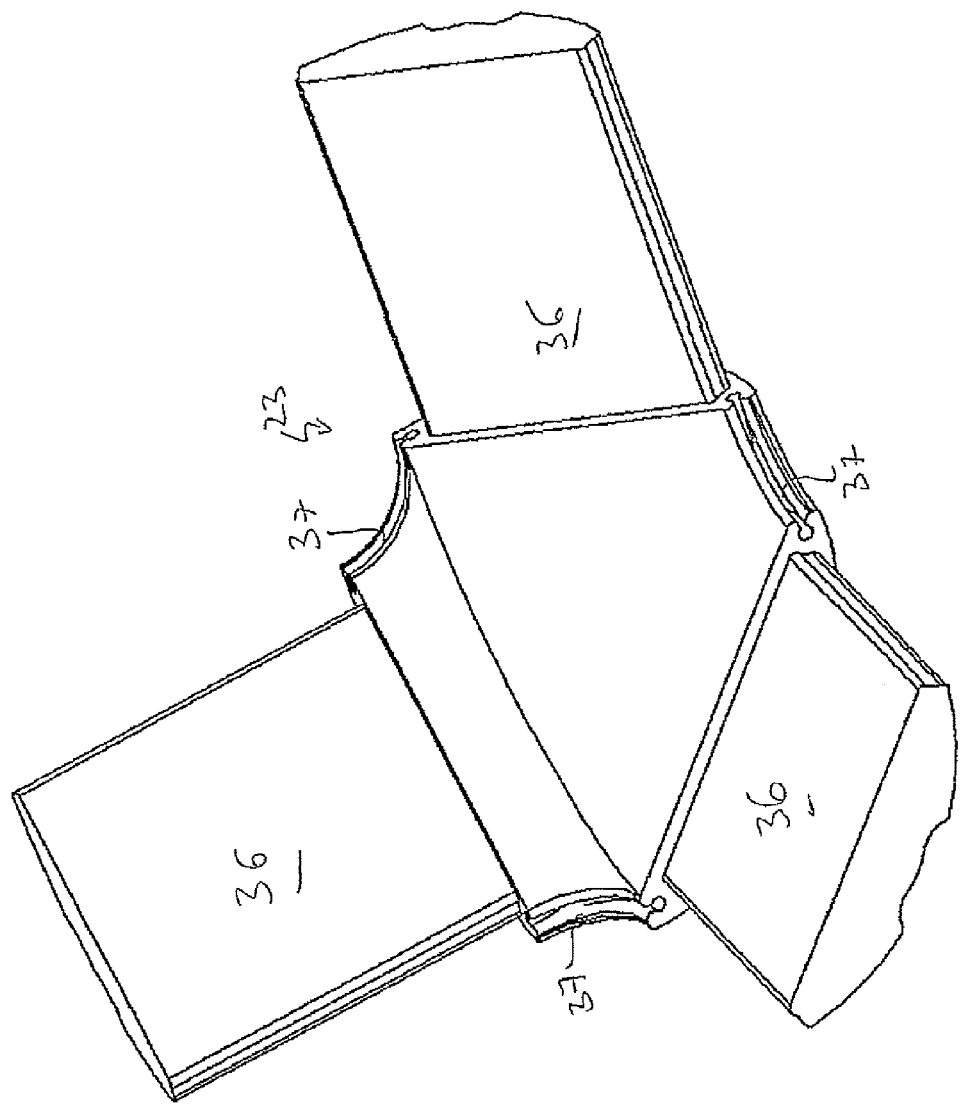
FIG. 10 a second embodiment of a corner element in a diagrammatic oblique view.
Figure 11:
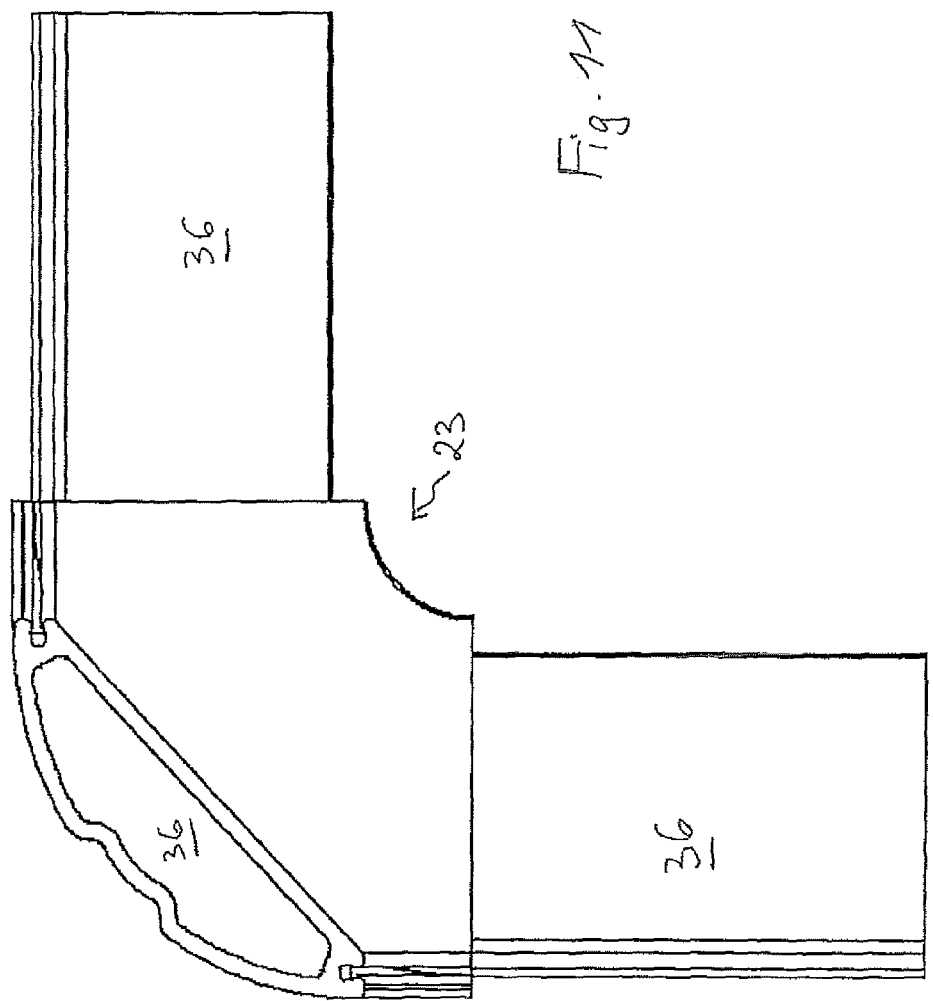
FIG. 11 the corner element according to FIG. 10 in a side view.

FIG. 10 shows a side corner element 23 in an oblique view. FIG. 11 shows the side corner element according to FIG. 10 in a side view. The side corner element 23 comprises the cavity receiving pins 36 which can be introduced into the corresponding cavities 25 of three second profile elements 18. Corner regions of the side walls 12a to 12d or the top 13 can be introduced where applicable into arcuate grooves 37. Another possibility for achieving a corner connection is shown below. As a whole, the side corner element 23 is formed as a three-legged angle bracket.

Figure 12:
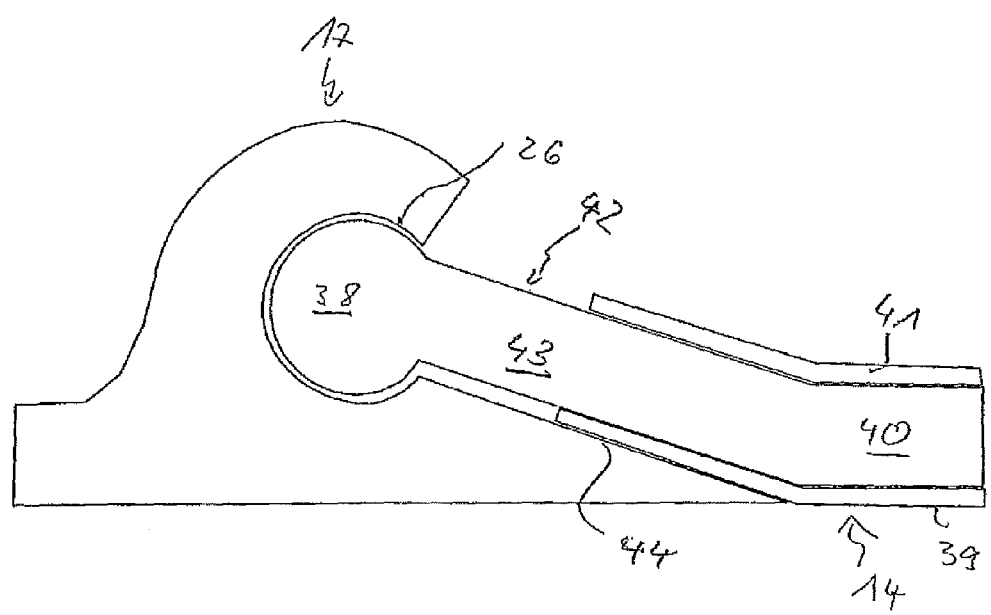
FIG. 12 an extract of the pultruded profile element according to the first embodiment and an extract of a bottom element, in a diagrammatic section view, according to a first embodiment.

FIG. 12 shows an extract of a bottom 14 (bottom plate) which is introduced into a first profile element 17 (shown in extract). The bottom 14 comprises a (round) edge bead 38 which is introduced into the bottom receiving groove 26 of the first profile element 17. Thus (horizontal) loads which occur in operation can be absorbed in a simple manner.

The bottom 14 comprises a first floor layer 39, a second floor layer 40 and a third floor layer 41. The first (lowest) floor layer 39 is preferably made of an aluminium alloy (in particular of the 7075 series) and can ensure sufficient support against transport rollers (PDU rollers). Above the first floor layer 39, the second floor layer 40 can be made of fibre-reinforced plastic (such as carbon-fibre-reinforced plastic and/or glass-fibre-reinforced plastic) and/or aramide and/or Kevlar. The second floor layer 40, or also a third floor layer 41 lying above the second floor layer, can form a (fine) braided layer (iron braided layer) in order to ensure an electromagnetic screening where required. As a whole, more than three floor layers can be provided. A combination of one or more of said materials, in particular fibre materials, is conceivable. The thickness of the bottom plate can be 1.5 to 4.5 mm, in particular (around) 3.2 mm. A metal plate on the underside (corresponding to the first floor layer 39) can have a thickness of 0.5 to 1 mm, in particular (around) 0.75 mm.

A bottom edge 42 has an upward bend 43 (in the direction of an interior of the cargo container). This achieves a favourable (flush) transition to the first profile element 17. Furthermore delamination of a metal support can be avoided when the transport rollers (PDU rollers) run over a corner edge of the bottom in operation. The upward bend 43 runs parallel to an oblique surface 44 of the first profile element 17. As evident from FIG. 12, in particular the first floor layer 39 (metal layer) can also be provided in the region of this oblique surface 44. It is also conceivable to extend the metal layer (first floor layer 39) into the bottom receiving groove 26. Such measures both achieve a stable connection and (largely) prevent delamination. One or more of the floor layers can be made of a fibre-reinforced plastic which contains at least one −45°/+45° layer and one 0°/90° layer. The reference line here is an edge of the bottom 14 (i.e. in FIG. 12, a direction perpendicular to the drawing plane). The figures in degrees relate to a mean orientation of the fibres within the fibre-reinforced plastics.

Figure 13:
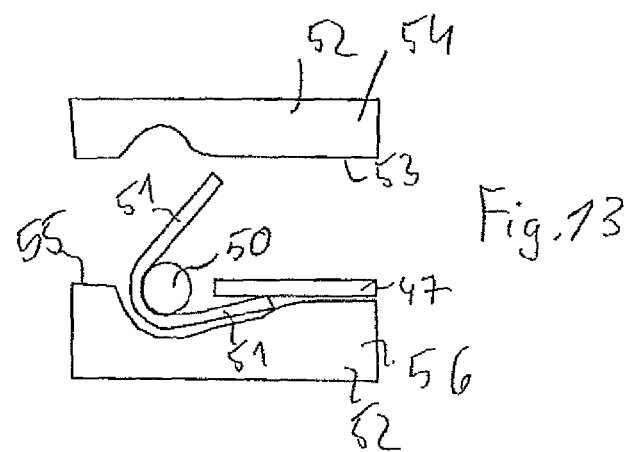
FIG. 13 parts of a wall and a mould for production of an edge bead in a diagrammatic section view.
Figure 14:
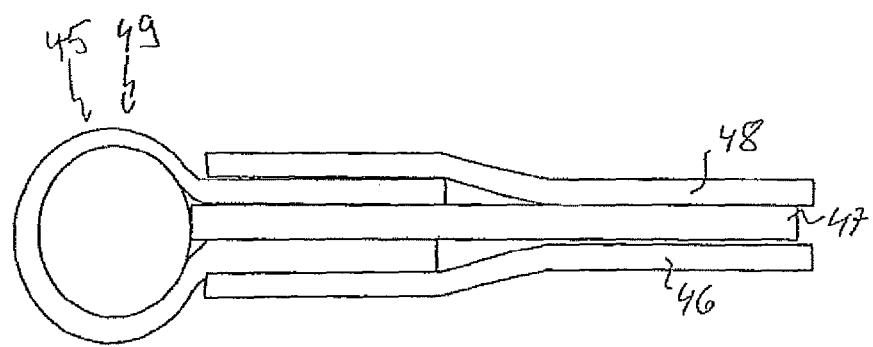
FIG. 14 an extract of an edge of a wall of the cargo holding device in a diagrammatic section view.

The fundamental construction of the side walls 12a to 12d and the top 13 can be seen (in extracts) in FIG. 14. FIG. 13 shows a part of the production process for achieving the structure in FIG. 14.

The side walls 12a to 12d and the top 13 can be formed tarpaulin-like (as tarpaulins) and comprise an edge bead 45 (see FIG. 14). The edge bead 45 runs at least partly around the side walls 12a to 12d and the top 13 and can preferably be inserted in the bottom corner elements 22 or second profile elements 18.

The side walls 12a to 12d (formed as tarpaulins) and the top 13 can be made of a carbon-fibre-reinforced plastic, a glass-fibre-reinforced plastic, aramide and/or Kevlar. Other fibre composite materials are conceivable. FIG. 14 (apart from a region adjacent to the edge bead 45) shows three layers (further layers can also be provided), namely a first side wall layer 46, a second side wall layer 47, and a third side wall layer 48. Preferably the second (middle) side wall layer 47 is formed as a 0°/90° layer (in relation to a side wall edge 49 which in FIG. 14 runs perpendicular to the drawing plane). (It should be pointed out here that where the term "side wall" or "side wall edge" or similar is used below, this can always also mean the top 13 or its associated elements, unless explicitly indicated otherwise). The first side wall layer 46 and the third side wall layer 48 are preferably formed as −45°/+45° layers. FIG. 15 indicates in solid lines 67 as an example the orientation of the −45°/+45° layers. The dotted lines 68 indicate the 0°/90° layers.

The middle layer 47 is thus formed to transmit in particular (pure) tensile forces between the profile elements 17, 18. The first and third side wall layers 46, 48 are preferably formed to support the corner points of the side walls 12a to 12d (or the top 13) or to transmit tensile forces from corner to corner.

The side wall layers 46 to 48 can be 0.1 to 0.4 mm thick, in particular (around) 0.25 mm. The side walls 12a to 12d or the top 13 can have a total thickness of around 0.5 to 1 mm, preferably 0.75 mm. Greater thicknesses are also conceivable (in particular for correspondingly high weights).

Preferably at least one of the three side wall layers 46 to 48 is made of aramide (Kevlar), in particular to achieve a high cutting resistance of the side wall. This further improves the security of the cargo holding device. For example, no unauthorised person can (with simple means) make a slit in the side walls 12a to 12d and introduce a dangerous object (for example a bomb). The aramide (Kevlar) also ensures that the cargo holding device is even more stable against damage (for example in the event of a collision with a forklift truck or similar).

In principle the side walls 12a to 12d and the top 13 are configured such that (in particular via the edge bead 45) tensile forces at the side wall edges 49 can be absorbed by the first and second profile elements (which means that the pultruded profile elements cannot become separated from each other, or only to a limited extent, and the structure of the frame of the cargo container 10 is retained). In particular the combination of the special layer arrangement (0°/90° layers and −45°/+45° layers) and the pultruded design of the profile elements allows a particularly lightweight but nonetheless stable construction.

Formation of the side walls 12a to 12d and the top 13 as a tarpaulin has the advantage that damage such as small holes can be repaired comparatively easily with a repair piece, which can for example be glued on.

FIG. 13 shows diagrammatically a first part of a production process for the edge bead 45. In a first step, a rod 50 is produced. The rod 50 can preferably be made of fibre-reinforced plastic (carbon-fibre-reinforced or glass-fibre-reinforced) and furthermore preferably be produced in a pultrusion process. The rod can have a diameter for example of 1.5 to 2.5 mm. The rod 50 is connected (preferably integrally) with tabs 51 (as portions, in particular flat, running along the rod). Preferably the rod 50 and the tabs 51 can be pultruded in a common pultrusion process. This considerably simplifies the production process. According to a concept claimed independently, a rod can thus be pultruded to form an edge bead of the side wall (or top or bottom) with two tabs running along the rod. The tabs 51 can stand at an angle of (around) 45 to 60° to each other.

The rod 50 with the tabs 51 can be laid in a mould 52. Further side wall layers (FIG. 13 shows the side wall layer 47) can already be laid in the mould 52. Preferably (not shown in FIG. 13) at least one further side wall layer in each case is arranged respectively on an inner face 53 of the first moulding tool 54 and on an inner face 55 of a second moulding tool 56. A preferred process sequence can then be as follows:

- Introduction of the first side wall layer 46 (not shown in FIG. 13) into the first moulding tool 45;
- Laying of the rod 50 with the tabs 51 between the first moulding tool 54 and the second moulding tool 56;
- Introduction of the second side wall layer 47 on the (lower) tab 51 or between the tabs 51;
- Introduction of the third side wall layer 48 (not shown in FIG. 13) between the second moulding tool 56 and the rod 50 with tabs 51;
- Advance of the mould 52 or bringing together the first moulding tool 54 and the second moulding tool 56;
- Optional heat application to join the side wall layers 46 to 48.

One or more of these steps can also be omitted. On advance of the mould 52, the tabs 51 are compressed and the rod 50 (load-bearing) is connected to the side wall 12a to 12d or the top 13.

For example, a further corner plate can be inserted in a corner region (see below) before the third side wall layer 48 is introduced.

FIGS. 15 to 18 show the attachment of the side walls 12a to 12d or the top 13 to a corner region 57 (see FIG. 15) of the frame. A corner plate 59 (see FIG. 16) is inserted in a side wall corner region 58. The corner plates 59 can for example have a triangular or rectangular contour and/or a thickness of (around) 1 to 4 mm, preferably 2 to 3 mm. The corner plates 59 can where applicable also be attached to the bottom corner elements 22 or side corner elements 23 by bolting and/or riveting.

The corner plates 59 inserted in the side walls 12a to 12d or the top 13 can where applicable dissipate forces via −45°/+45° layers, such that the frame 11 of the cargo container 10 cannot shift obliquely (as is the case for example with known supporting structures for bridges or decks). Thanks to the different layer directions (−45°/+45° and 0°/90°), with low material usage and low weight, a high-strength construction can be achieved which directly transfers loads from (pure) tensile forces into the frame 11 via the side walls or top (and vice versa). Also it is easy to exchange a damaged side wall or top, since no fixed connections such as rivets are required and the side walls or top can easily be drawn out of the profile elements in large parts (and where applicable may need to be unbolted at the corners). The push-fit construction of the frame 11 according to the invention further facilitates such an exchange.

The corner plates 59 can either be a (preproduced) plastic part (where applicable comprising a fibre component) or a metal part (for example of an aluminium alloy), in particular a punched metal part. Here too (in the connection of a metal or in particular aluminium part) corrosion protection must be ensured, in particular when carbon-fibre-reinforced plastic is used. Bores 60 (see FIG. 16) can be preproduced in the corner plates 59. These bores 60 can have a (comparatively high) edge break 61 (on one or both opposing outer faces of the corner plate 59). Preferably the corner plate tapers in the direction of a middle of the respective side wall 12a to 12d or top 13, in particular to provide a stable (flush) transition from the plate, approximately 2-3 mm thick, to the (around) 0.75 mm thick tarpaulin.

A mould for producing the connection of the respective side wall 12a to 12d or top 13 to the corner plate 59 can have a pin with a conical portion to press material of one of the side wall layers 46 to 48, in particular of the first side wall layer 46 and/or of the third side wall layer 48, into the bores 60 or their edge breaks 61 (see FIG. 16). For this it is necessary to position the corner plate 49 as precisely as possible in the production mould. The first side wall layer 46 and the third side wall layer 48 can be pressed (obliquely downward) on closure of the mould into a depression 62 delimited by the edge break 61. The fibres should not be destroyed here, but should be shaped around the bore 60.

The extract according to FIG. 17 shows further details of a bolt joint with a bolt 63 and a nut 64. Both the bolt 63 and the nut 64 have a (comparatively large) flange portion 65 (the flange portions 65 need not be provided simultaneously) Overall, the bolt 63 has an enlarged head 66 which can be adapted to the first edge break 61. The first side wall layer 46 is bent inward by the production process described above. The third side wall layer 48 is bent inward accordingly in the region of the associated edge break 61. As a whole, the present construction achieves an improved and clearly defined force flow in the corner region 57.

Figure 18:
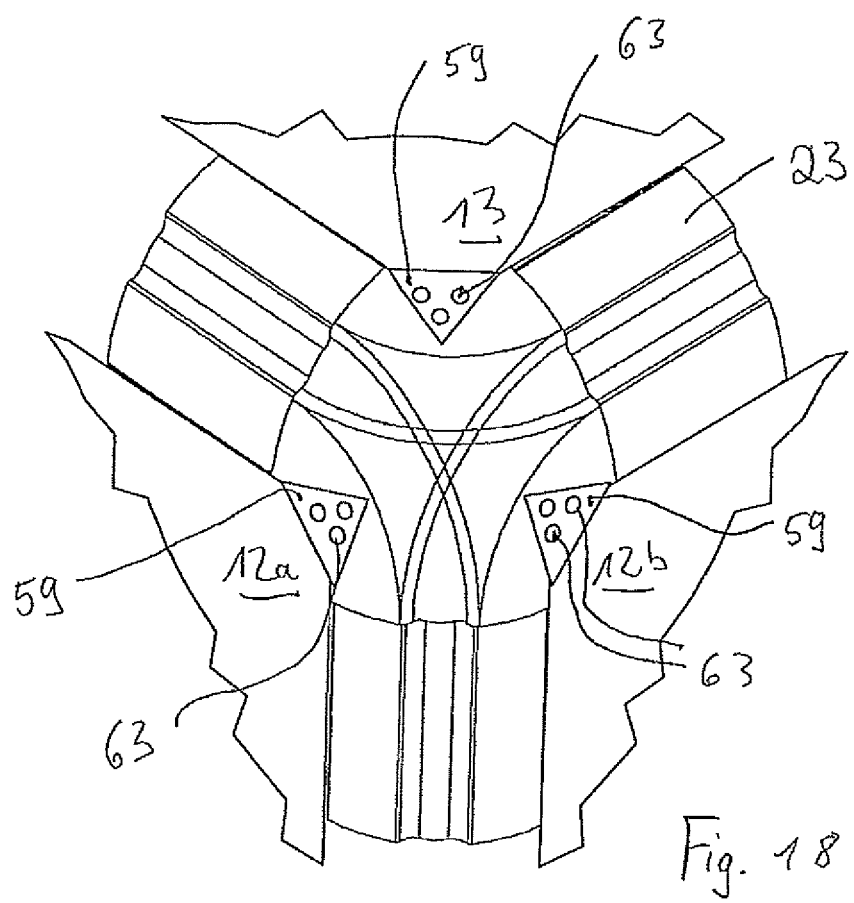
FIG. 18 a side corner element with extracts of two side walls and a top.

FIG. 18 shows a diagrammatic oblique view of a side corner element 23 with an extract of a side wall 12a, a side wall 12b and the top 13. The side walls 12a, 12b and the top 13 are connected to the side corner element 23 via corresponding corner plates 59. The corner plates 59 have a triangular contour and are connected via several (three) bolts 63 firstly to the side walls 12a, 12b and the top 13, and secondly to the side corner element 23. According to the diagrammatic depiction in FIG. 17, the corner plates 59 are arranged above the side walls 12a, 12b and the top 13. In a preferred embodiment however, the corner plates 59 are introduced into the side walls 12a, 12b and the top 13 (at least in regions) (see FIGS. 15 to 17).

Figure 19:
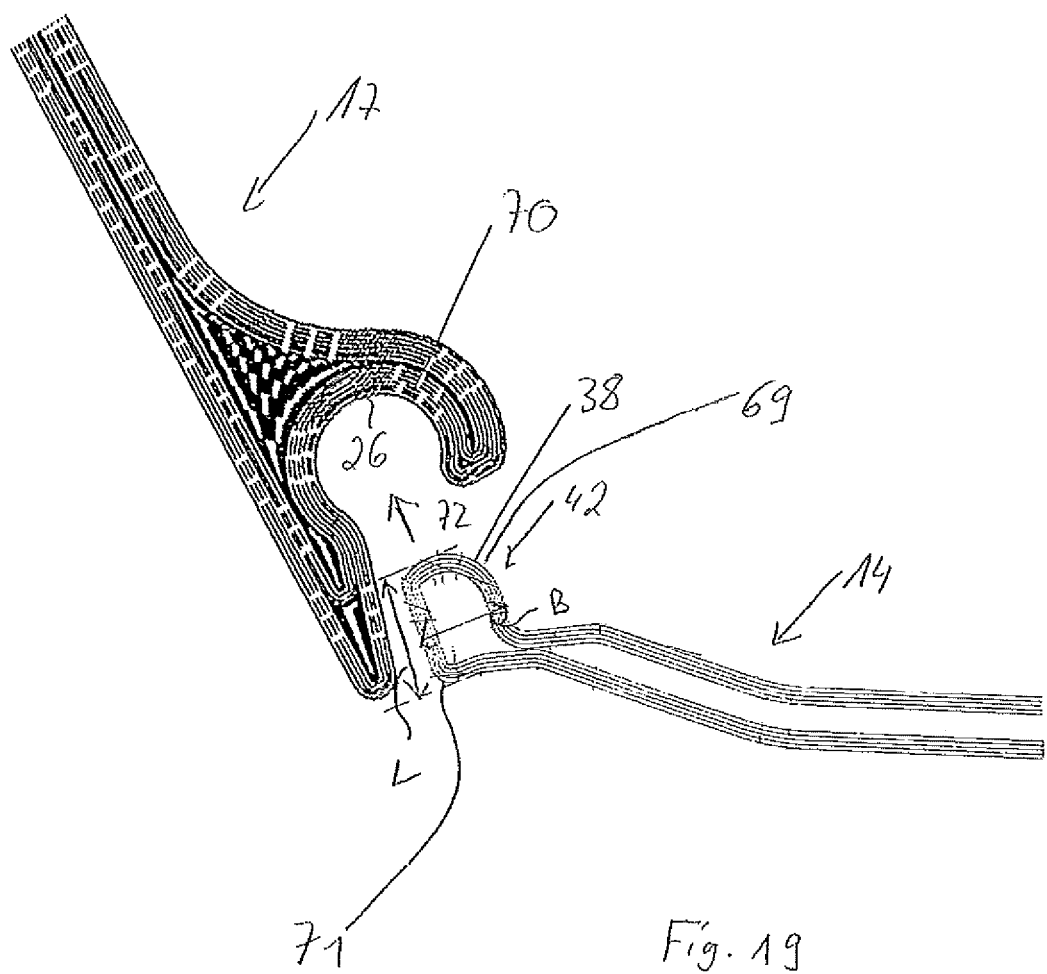
FIG. 19*a* diagrammatic section view of an extract of a profile element and an extract of a bottom element, in a diagrammatic section view, according to a second embodiment, in a first relative position.

FIG. 19 shows extracts of a first profile element 17 and the bottom element 14 according to a second embodiment (in cross-section). The bottom element 14 according to FIG. 19 is multi-layered in structure. The profile element 17 (with regard to its shape) is formed like the profile element according to FIGS. 4-6.

Figure 20:
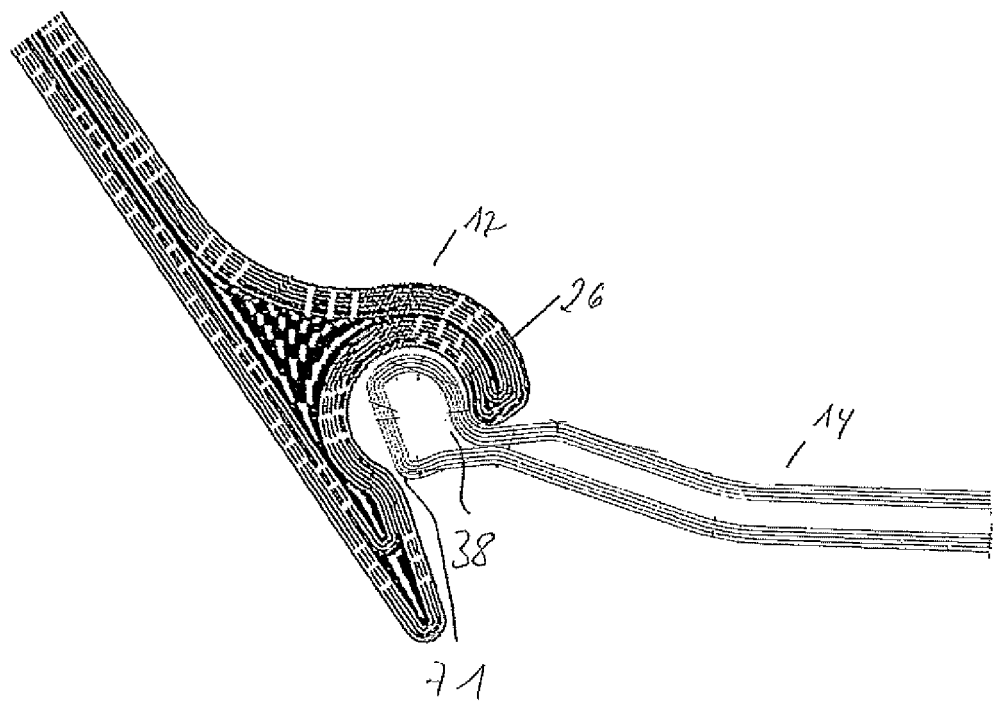
FIG. 20 the profile element and the bottom element according to FIG. 19 in a second relative position.
Figure 21:
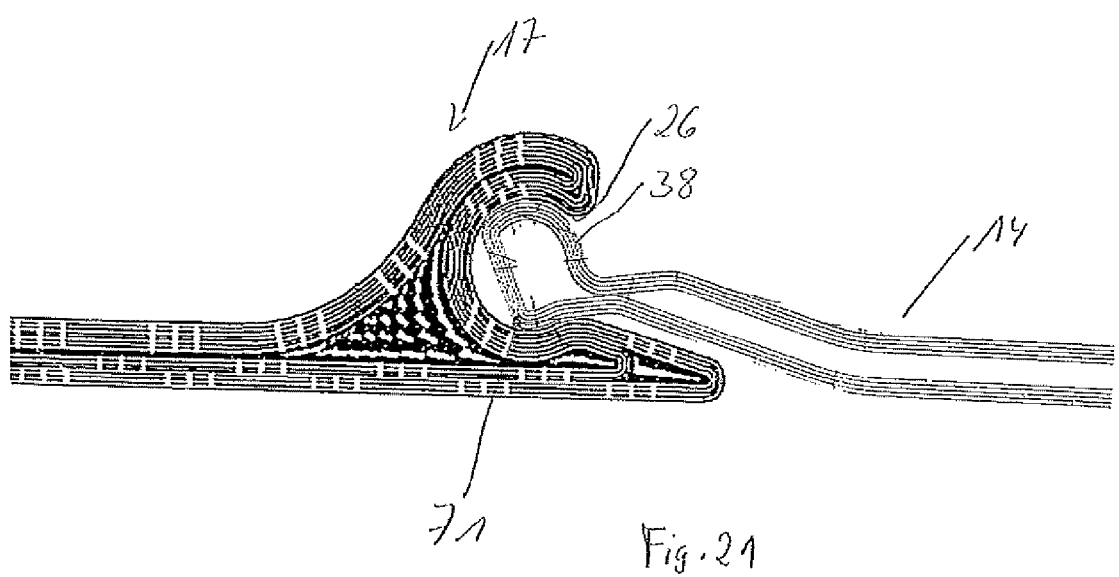
FIG. 21 the profile element and the bottom element according to FIG. 19 in a third relative position.

The bottom 14 consists of two (multilayered) layers which are folded at the bottom edge 42 so that they overlap each other. The bottom edge 42 has an (upward protruding) edge bead 45. The edge bead 45 has a length L and a width B. The length L is greater than the width B (around 1.2 times as large). The edge bead 38 has (in cross-section) a circle arc portion 69 which corresponds to a circle arc portion 70 of the bottom receiving groove 26 of the profile element 17. Opposite the circle arc portion 69, the cross-section of the edge bead 38 has a protrusion 71 which serves to move the edge bead 38 or bottom edge 42 into the bottom receiving groove 26 (on rotation). A distal end of the segment adjacent to the circle arc portion 69 is formed flat. Thus the edge bead 38 can be kept comparatively narrow so that it can be introduced into the bottom receiving groove 26. This simplifies the connection of bottom element and profile element. If the edge bead 38 is now moved (translationally) along an arrow 72 into the bottom element receiving groove 26, the relative position of profile element and bottom element results which is shown in FIG. 20. If the bottom element 14 and profile element 17 are now rotated in relation to each other (see FIGS. 20 and 21), the edge bead 38 hooks into the bottom receiving groove 26. The edge bead 38 thus forms a hook. The angle of rotation between the positions shown in FIG. 20 and FIG. 21 is (approximately) 40-70 degrees. In the final position shown in FIG. 21, the bottom faces of profile element 17 and bottom element 14 are parallel to each other.

Figure 22:
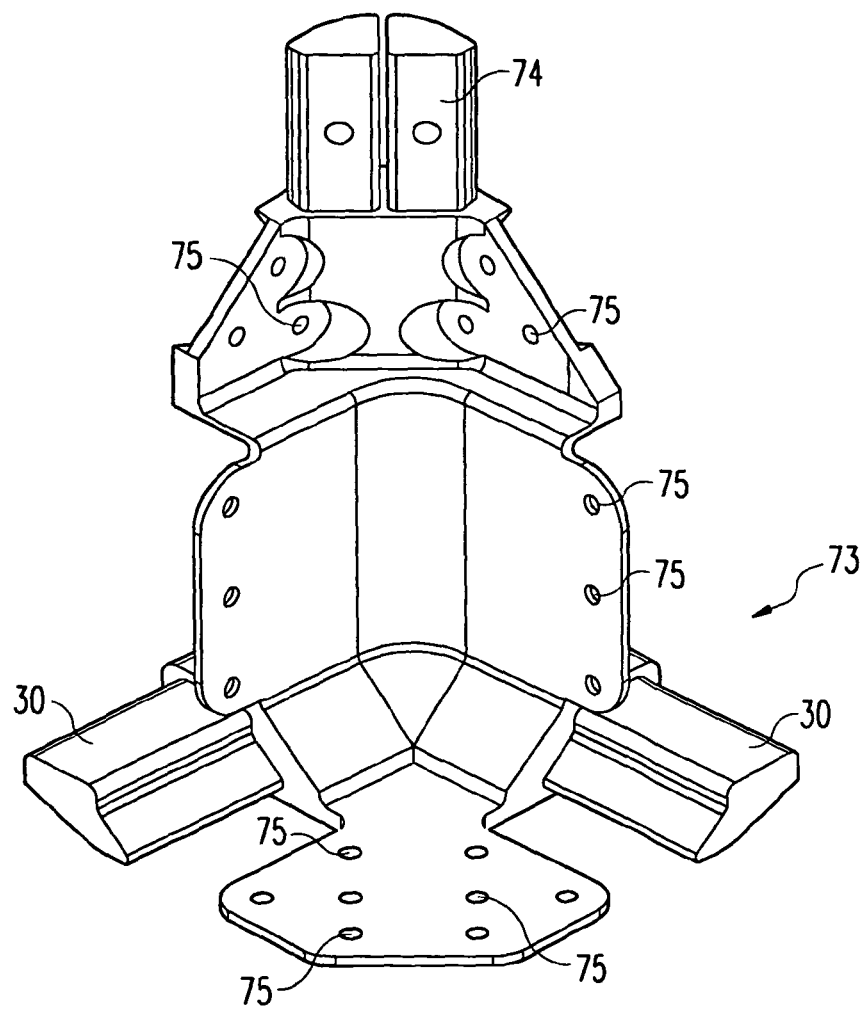
FIG. 22 an oblique view of an alternative configuration of a corner element.

FIG. 22 shows a diagrammatic oblique view of a further embodiment of a corner element. The bottom corner element 73 is formed like the bottom corner element 22 according to FIGS. 7 and 8 for connection (by push-fit) to two first profile elements 17. For this, two cavity receiving pins 30 are formed, onto which a cavity 24 of the first profile element 17 (see FIG. 6) can be pushed. An outer contour of the cavity receiving pins 30 corresponds to an inner contour of the cavities 24 of the first profile element 17. In contrast to the embodiment according to FIGS. 7 and 8, in the embodiment according to FIG. 22 there is no seat rail receiving pin 31 (this can also be omitted in the embodiment according to FIGS. 7 and 8 and/or provided in the embodiment according to FIG. 22). A third cavity receiving pin 74 is provided, to be connected to the second profile element 18 (see FIG. 9) via a push-fit connection. For this, the outer contour of the third cavity receiving pin 74 is formed corresponding to the inner contour of the cavity 25 of the second profile element 18 (see FIG. 9). The bottom corner element 73 according to FIG. 22 has a plurality of bores 75 into which pins (or bolts or similar) can be introduced in order to connect straps (for example running diagonally) or other elements of the cargo container to the bottom corner element 73.

Figure 23:
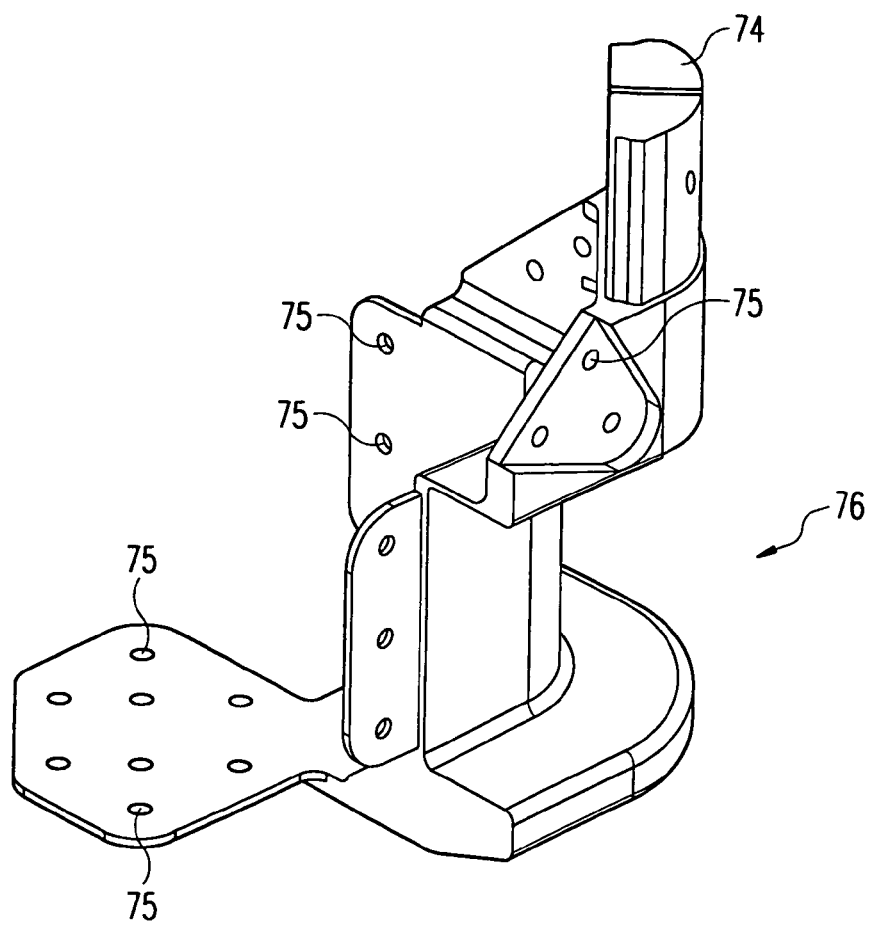
FIG. 23 a further alternative embodiment of a corner element in an oblique view.

FIG. 23 shows a further embodiment of a bottom corner element or end corner element 76. The end corner element 76 corresponds to the bottom corner element 73 according to FIG. 22 with the difference that the bottom corner element 76 has no cavity receiving pins 30. The cavity receiving pin 74 to receive the second profile element 18 is however provided. The bottom corner element 76, in contrast to the bottom corner element 73 according to FIG. 22, is not suitable for creating a push-fit connection to the first profile element 17.

In a concrete embodiment of the cargo container, three corner elements 73 according to FIG. 22 are provided and one bottom corner element 76 according to FIG. 23. Thus in a simple manner, a peripheral frame can be produced which can be constructed completely without adhesives or bolt joints or similar. Sufficient stability is however guaranteed (wherein also the bores 75 or corresponding support elements, such as for example diagonally running straps, can contribute to this).

Figure 24:
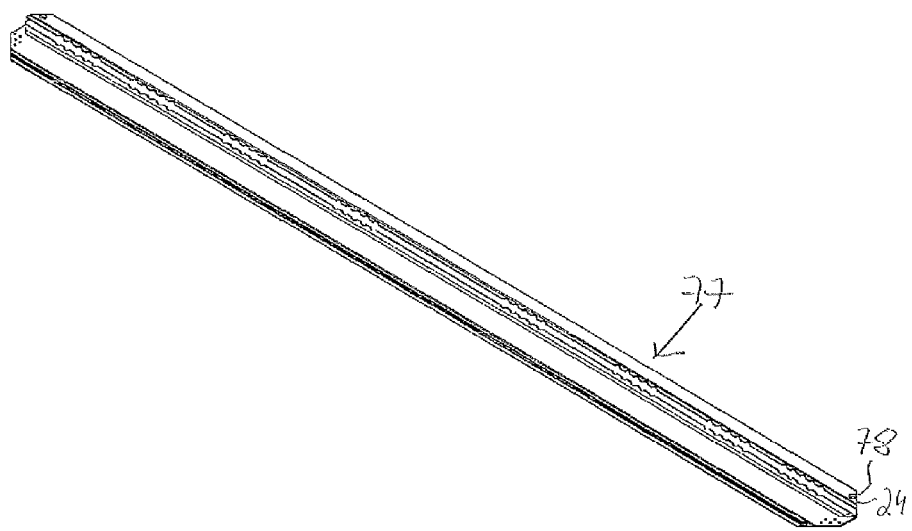
FIG. 24 an alternative embodiment of a profile element in an oblique view.
Figure 25:
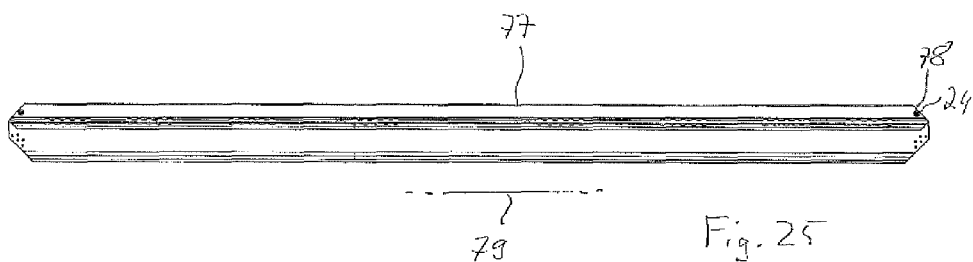
FIG. 25 the embodiment of the profile element according to FIG. 24 in a top view.

FIG. 24 shows an alternative embodiment of a profile element (here marked with reference numeral 77) in oblique view. The profile element 77 according to FIG. 24 is constructed in principle like the profile element 17 according to FIG. 4 (wherein differences are described in more detail below). In particular, the profile element 77 also has a cavity 24 which is provided as a push-fit connection receiver for push-fit connection pins. As evident from FIG. 4, an edge of the cavity 24 runs perpendicular to a longitudinal extension of the profile. In contrast to the embodiment according to FIG. 4, in the embodiment according to FIGS. 24 and 25 it is evident that a push-fit connection recess edge 78 runs at an angle (of 45°) to a profile longitudinal axis 79 (see FIG. 25). As shown in FIG. 28, an inner edge portion 80 of the cavity 24 is offset (forward) in relation to an outer edge portion 81, namely by an offset 82. The term "forward" here means that the inner edge portion 80 is further away from the profile element centre than the outer edge portion 81. In total therefore the cavity 24 (or the push-fit connection recess 24) is open not only to the front but also to the outside. Thus an alternative corner element 83 (according to FIGS. 26 and 27) can be connected to the profile element 77 by an oblique translational movement (more details are given below).

Figure 26:
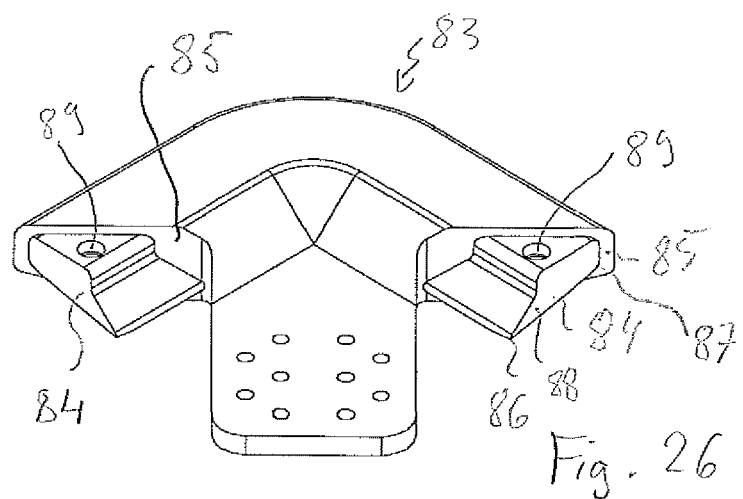
FIG. 26 an alternative embodiment of a corner element in an oblique view.
Figure 27:
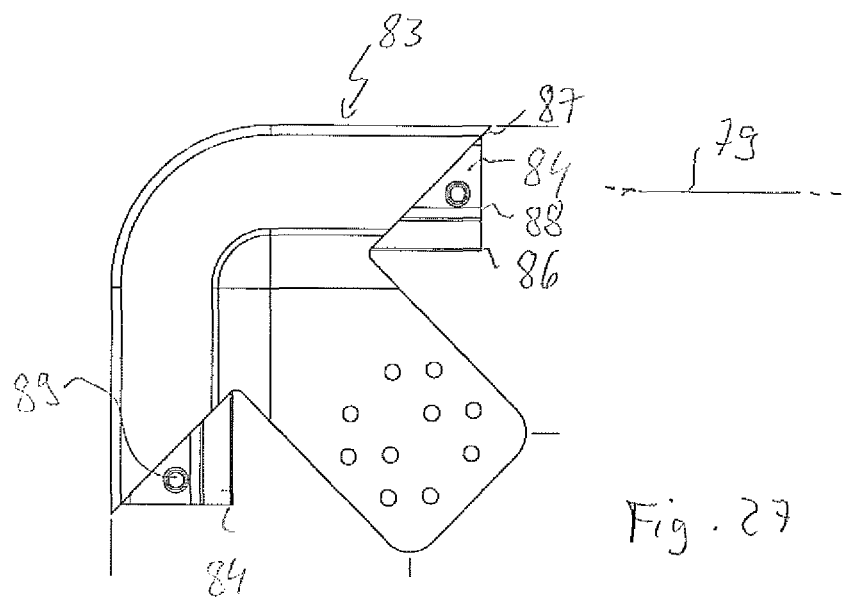
FIG. 27 the embodiment of the corner element in FIG. 26 in a top view.
Figure 28:
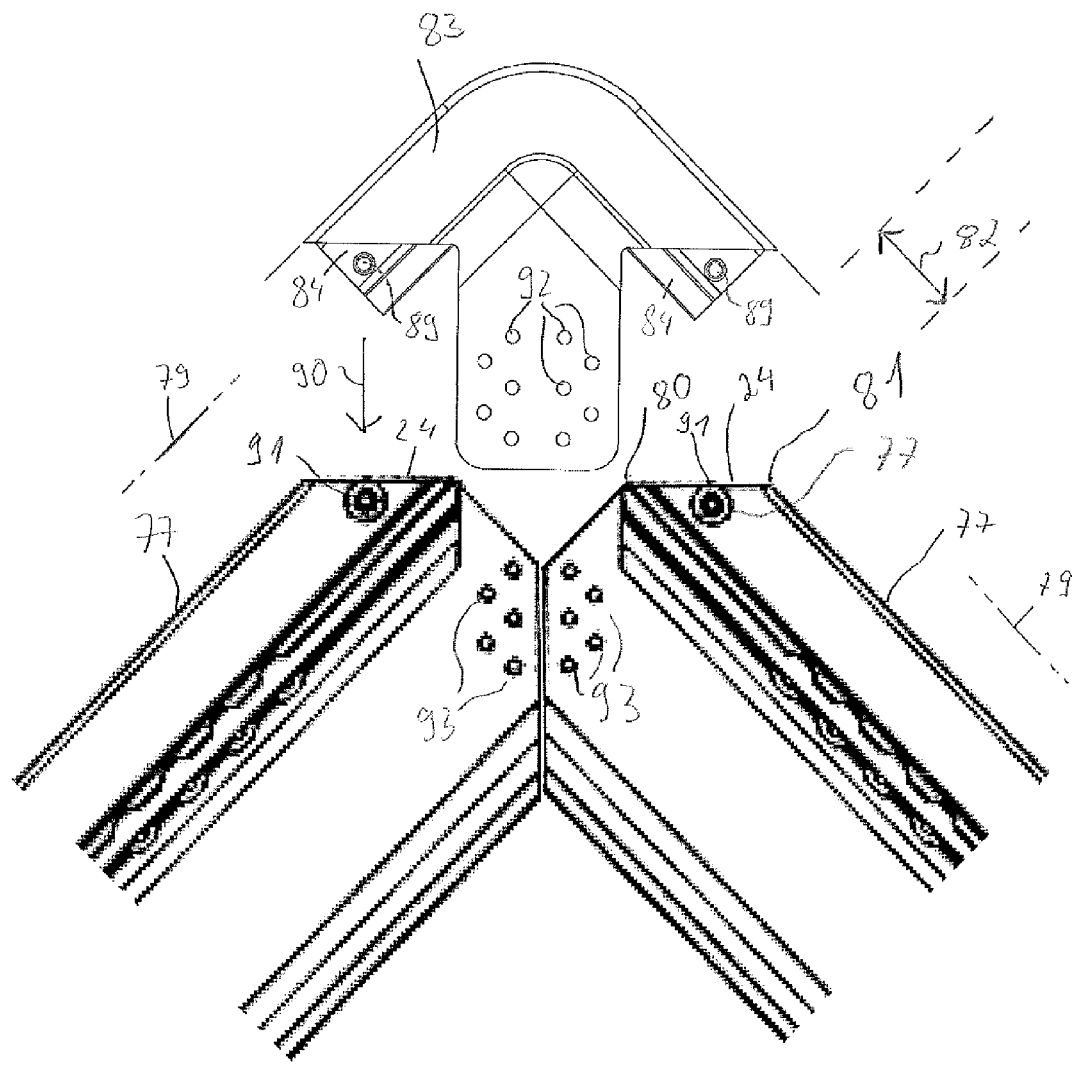
FIG. 28 the profile element according to FIG. 27 and extracts of two profile elements according to FIG. 25.

The corner element 83 according to FIGS. 26 and 27 has two push-fit connection pins 84 which each protrude from a pin base surface 85. An inner edge portion 86 of the push-fit connection pin 84 is at the same height as an outer edge portion 87 in relation to the profile longitudinal axis 79 (in mounted state; see FIG. 27). The pin end faces 88 thus run perpendicular to the profile longitudinal axis 79. The pin base surface 85 has an angle (of 45°) to the profile longitudinal axis 79.

A bore 89 is provided in each push-fit connection pin 84. The bores 89 run vertically in mounted state.

As shown in particular in FIG. 28, the corner element 83 can be connected to two profile elements 77 (shown in portions) by a translational movement. The movement direction is marked with the arrow 90. An angle between the movement direction according to arrow 90 and the profile longitudinal axis 79 of the profile elements 77 in the present embodiment example is 45°. Due to the particular design of the profile elements 77 and the corner element 83, the frame can be closed by linking the elements together without the profile element 77 or corner element 83 having to be deformed. This achieves a stable, closed frame construction with extremely simple means. To prevent the corner element 83 from becoming detached again from the profile element 77 after the push-fit connection pins 84 have been inserted in the cavities 24, as well as the bores 89 of the corner element 83, corresponding bores 91 can be produced in the profile elements 77. Pins or bolts (fixing means) for example can be introduced in these bores to fix the corner element 83 in relation to the profile elements 77. The fixing means for insertion into the bores 89, 91 can be pins or bolts which have a head and an upper and a lower (cylindrical) shoulder. The upper shoulder is the shoulder which lies closer to the head than the lower shoulder. The upper shoulder can connect the corresponding corner element (rotationally stiffly) to a first face of a profile element. The lower (cylindrical) shoulder can connect the corner element to a second face of the same profile element (or a web of the profile element) rotationally stiffly. The second face can lie opposite the first face. The first (cylindrical) shoulder can have a greater diameter than the second (cylindrical) shoulder. As a whole, with such a fixing means a reliable, rotationally stiff connection is achieved between the corner element and the profile element. A further fixing can be achieved by a plurality of fixing elements 92 of the corner element 83 and corresponding fixing elements 93 of the profile elements 77. The fixing elements 92, 93 can for example also be bores or pins.

FIGS. 29 and 30 show two different side views of an alternative embodiment of a corner element 94. The corner element 94 is provided to be connected to profile elements 95 which are shown in portions in FIG. 31. In concrete terms, three profile elements 95 are provided in the corner region according to FIG. 31. The corner element 94 has several (6 or 3×2) corner element push-fit connection recesses 96. The profile elements 95 shown in FIG. 31 (each) have two profile element push-fit connection recesses 97. An inner contour of the corner element push-fit connection recesses 96 corresponds to an inner contour of the profile element push-fit connection recesses 97. To connect the corner element 94 according to FIGS. 29, 30 to the profile elements 95 according to FIG. 31, a separate pin is provided which is not shown in FIGS. 29 to 31. This separate pin is mounted movably in relation to both the corner element and the profile elements. A movement runs preferably in the profile element longitudinal direction.

FIG. 32 also shows the corner element 94 together with three profile elements 95 (in portions). It is also evident that (movable) push-fit connection pins 98 are arranged in the profile element push-fit connection recesses 97. These movable push-fit connection pins 98 can be moved in relation to both the profile elements 95 and the corner element 94. However in addition the push-fit connection pins 98 can be fixed in relation to both the corner element 94 and the profile elements 95. For this (as in the present case) bores 99 (in general: fixing means) can be provided in the movable push-fit connection pins 98, profile elements 95 and in the corner element 94. Depending on design, pins or bolts (in general: fixing means) can be introduced into the bores 99 to fix the movable push-fit connection pin in relation to the corner element 94 and/or the profile elements 95. A core concept of this embodiment is that no fixed push-fit connection pin is used, but a movable (where applicable detachable) push-fit connection pin. The solution according to FIGS. 29 to 32 can be used for example on only one corner element. It is however also conceivable to equip several corner elements or all corner elements of a cargo holding device with such a solution. A particular advantage of this refinement is that firstly a cargo holding frame can be "closed" particularly easily. Secondly, a cargo holding frame can be provided in which no further elements need be removed in order to exchange a profile or corner element (or further element). For example an individual profile element or an individual wall element (tarpaulin) can be removed independently from the cargo holding device.

FIG. 33 shows an alternative embodiment of a cargo container in an oblique view. The cargo container 10 according to FIG. 33 is constructed in principle like the cargo container 10 according to FIG. 1. The cargo container 10 according to FIG. 33 has a plurality of reinforcement elements 100 which serve to further stabilise the cargo container 10 (such reinforcement elements can also be provided in the previous embodiments). The reinforcement elements 100 run diagonally from one corner of a corresponding wall to another, so that two reinforcement elements 100 run in a cross shape for each given wall element.

Furthermore the cargo container 10 according to FIG. 33 has a stiffening element 101 (stiffening rib or stiffening plate). The stiffening element 101 is adjacent to an overhanging wall 102 and a (vertical) wall 103 adjacent to the overhanging wall. The stiffening element 101 is therefore arranged in a balcony region 104 of the cargo container 10. The (rib-like) stiffening element 101 is adjacent to an upper corner 105 and a lower corner 106 and can therefore rest simultaneously on the upper corner 105 and lower corner 106 as a spacer. The stiffening element 101 can be held in the side wall receiving grooves. At the same time, the balcony region 104 can be connected directly via bolts.

Furthermore, eyes 107 are provided in the stiffening element 101. These eyes can be used for straps. The advantage of this refinement with the stiffening element 101 lies in particular in that even on a comparatively "rough" loading of the cargo container 10, the balcony region 104 remains sufficiently stable. As a whole, this improves the stability of the cargo container 10.

It should be pointed out here that all parts described above are claimed as essential to the invention both viewed alone and in any combination, in particular the details depicted in the drawings. Derivations from this are well known to the person skilled in the art.

List of Reference Numerals

10 Cargo container
11 Frame
12a to 12d Side wall
13 Top
14 Bottom
15 Oblique portion
16 Vertical portion
17 First profile element
18 Second profile element
19 Bottom frame
20 Side frame
21 Top frame
22 Bottom corner element
23 Side corner element
24 Cavity
25 Cavity
26 Bottom receiving groove
27, 27a, 27b Side wall receiving groove
28 Seat rail construction
29 Hook
30 Cavity receiving pin
31 Seat rail receiving pin
32 Side wall web
33 Distal end
34 Arcuate groove
35 Recess
36 Cavity receiving pin
37 Arcuate groove
38 Edge bead (hook)
39 First floor layer
40 Second floor layer
41 Third floor layer
42 Bottom edge
43 Upward bend
44 Sloping surface
45 Edge bead
46 First side wall layer
47 Second side wall layer
48 Third side wall layer
49 Side wall edge
50 Rod
51 Tab
52 Mould
53 Inner face
54 First moulding tool
55 Inner face
56 Second moulding tool
57 Corner region
58 Side wall corner region
59 Corner region
60 Bore
61 Edge break
62 Depression
63 Bolt
64 Nut
65 Flange portion
66 Head
67 Line
68 Lines
69 Circle arc segment
70 Circle arc segment
71 Protrusion
72 Arrow
73 Corner element
74 Third cavity receiving pin
75 Bore
76 End corner element
77 Profile element
78 Push-fit connection receiving edge
79 Profile longitudinal axis
80 Inner edge portion
81 Outer edge portion
82 Offset
83 Corner element
84 Push-fit connection pin
85 Pin base surface
86 Inner edge portion
87 Outer edge portion
88 Pin end face
89 Bore
90 Arrow (movement direction)
91 Bore
92 Fixing element
93 Fixing element
94 Corner element
95 Profile element
96 Corner element push-fit connection recess
97 Profile element push-fit connection recess
98 (Movable) push-fit connection pin
99 Bore
100 Reinforcing element
101 Stiffening element
102 (Overhanging) wall
103 (Vertical) wall
104 (Balcony region)
105 Corner
106 (Lower) corner
107 Eye

The invention claimed is:

1. A cargo holding device comprising;
a bottom element, profile elements, corner elements and at least one push-fit connection pin, wherein the push-fit connection pin can be introduced into one of the corner elements and/or into one of the profile elements, wherein the push-fit connection pin is movable in relation to both the corner element and the profile element.

2. The cargo holding device of claim 1, wherein
a bottom element edge portion of the bottom element and/or a side wall edge portion of a side wall is connected to a plurality of the profile elements and a plurality of the corner elements, the plurality of the profile elements are connected to the corner elements via push-fit connections, at least one of the profile elements is connected to at least one of the corner elements via the push-fit connection which comprises the push-fit connection recess and a corresponding push-fit connection pin, wherein a push-fit connection recess and the push-fit connection pin are configured such that the at least one of the profile elements and the at least one of the corner elements can be connected together by push-fit by a translational movement in a translational movement direction, wherein the translational movement direction has an angle in relation to a profile longitudinal axis of the profile element.

3. The cargo holding device according to claim 2, wherein an inner edge portion of the push-fit connection pin is offset in the profile longitudinal direction in relation to an outer edge portion of the push-fit connection pin, and/or an inner edge portion of the push-fit connection recess is offset in the profile longitudinal direction in relation to an outer edge portion of the push-fit connection recess, by an offset.

4. The cargo holding device according to claim 2, including a push-fit connection recess edge and/or a push-fit connection pin end face that can at least in portions run at an angle in relation to the profile longitudinal axis of less than 90°.

5. The cargo holding device according to claim 2, wherein the push-fit connection recess is open towards the outside, and/or the inner edge portion of the push-fit connection pin and the outer edge portion of the push-fit connection pin are at the same height in relation to the profile longitudinal axis.

6. The cargo holding device according to claim 1, wherein the push-fit connection pin is part of the corner element and the push-fit connection recess is part of the profile element, or conversely the push-fit connection pin is part of the profile element and the push-fit connection recess is part of the corner element.

7. The cargo holding device according to claim 2, wherein the push-fit connection pin is arranged on a pin base surface which runs at least in portions at an angle in relation to the profile longitudinal axis of greater than 0°.

8. The cargo holding device according to claim 7, wherein the pin base surface stops on a push-fit connection recess edge.

9. The cargo holding device according to claim 1, wherein at least one bore is provided in the push-fit connection pin and in a connecting segment defining the push-fit connection recess, wherein the bores align with each other in mounted state.

10. The cargo holding device according to claim 1 wherein a bottom element edge portion of the bottom element and/or a side wall edge portion of a side wall is connected to a plurality of the profile elements, wherein the profile elements are connected together via a plurality of push-fit connections, wherein two adjacent profile elements each form a push-fit connection with a third profile element only at their end facing away from the respective other profile element.

11. The cargo holding device according to claim 10, wherein several corner elements are provided which are each connected to two profile elements via a corresponding push-fit connection, wherein an end corner element is provided which is connected to a maximum of one profile element via a corresponding push-fit connection.

12. The cargo holding device according to claim 10 wherein several corner elements are provided with two push-fit connection pins, wherein one end corner element is provided which has a maximum of one push-fit connection pin.

13. The cargo holding device according to claim 1, wherein at least one edge portion of the bottom element is detachably connected to the at least one profile element via a connecting device comprising at least one hook.

14. The cargo holding device according to claim 13, wherein the connecting device is formed such that a connection between the bottom element and one of the profile elements can be created via a push-fit with subsequent rotation.

15. The cargo holding device of claim 1, wherein the push-fit connection pin is movable along a profile longitudinal direction.

16. The cargo holding device according to claim 1, wherein the push-fit connection pin is insertable in and/or removable from a corresponding push-fit connection recess.

17. The cargo holding device of claim 1, wherein the push-fit connection pin is fixable and/or lockable in relation to the corresponding profile element or the corresponding corner element.

18. The cargo holding device of claim 17, wherein the push-fit connection pin is releasably fixable in relation to the corresponding profile element and/or corresponding corner element.

19. The cargo holding device of claim 17, wherein bores are provided in the at least one corner element or in the at least one profile element.

20. The cargo holding device of claim 19, wherein a pin or a bolt is introducible into the bores.

21. The cargo holding device of claim 1, comprising at least one wall element having a stiffening element running from one wall corner to the diagonally opposite wall corner.

22. The cargo holding device of claim 21, wherein the stiffening element comprises an additional wall layer:

23. The cargo holding device of claim 1, comprising at least one wall element, said wall element comprising a tarpaulin.

24. The cargo holding device of claim 1, wherein the cargo holding device comprises a stiffening element arranged in a balcony region of the cargo holding device.

25. The cargo holding device of claim 24, wherein the stiffening element is a stiffening rib or a stiffening plate.

26. A method for production of a cargo holding device comprising at least one bottom element, at least one profile element, at least one corner element, and at least one movable push-fit connection pin, wherein a connection between the at least one profile element at the at least one corner element is realized by a movement of the push-fit connection pin.

27. The method according to claim 26, comprising a plurality of profile elements which are connected to an edge of the at least one bottom element, wherein several profile elements are connected to both adjacent profile elements via a push-fit connection, wherein two adjacent end profile elements are each connected to a third profile element via a push-fit connection only at their ends facing away from each other.

28. The method according to claim 26 wherein at least one of the bottom elements and at least one of the profile elements connected to the at least one bottom element are provided, wherein the bottom element and the profile element are brought together at a first predefined angle and then hooked by rotation.

* * * * *